(12) United States Patent
Pitwon

(10) Patent No.: US 8,731,343 B2
(45) Date of Patent: May 20, 2014

(54) OPTICAL PRINTED CIRCUIT BOARD, A METHOD OF MAKING AN OPTICAL PRINTED CIRCUIT BOARD AND AN OPTICAL WAVEGUIDE

(75) Inventor: Richard C. A. Pitwon, Fareham (GB)

(73) Assignee: Xyratex Technology Limited, Havant (GB)

( * ) Notice: Subject to any disclaimer, the term of this patent is extended or adjusted under 35 U.S.C. 154(b) by 234 days.

(21) Appl. No.: 13/034,468

(22) Filed: Feb. 24, 2011

(65) Prior Publication Data

US 2012/0219249 A1    Aug. 30, 2012

(51) Int. Cl.
*G02B 6/10* (2006.01)
*G02B 6/12* (2006.01)

(52) U.S. Cl.
USPC .............................. 385/14; 385/132

(58) Field of Classification Search
USPC .................................... 385/132, 14
See application file for complete search history.

(56) References Cited

U.S. PATENT DOCUMENTS

| | | |
|---|---|---|
| 3,253,500 A | 5/1966 | Hicks, Jr. |
| 3,808,549 A | 4/1974 | Maurer |
| 4,167,305 A | 9/1979 | Ichiba et al. |
| 4,615,583 A | 10/1986 | Tsuno et al. |
| 4,647,153 A | 3/1987 | Utsumi et al. |
| 4,759,603 A * | 7/1988 | Jones ........................... 385/132 |
| 4,799,761 A | 1/1989 | Yamamoto et al. |
| 4,883,338 A | 11/1989 | Abe et al. |
| 5,037,507 A | 8/1991 | Matz et al. |
| 5,113,470 A * | 5/1992 | Fukushima et al. .......... 385/126 |
| 5,381,505 A | 1/1995 | Fischietto et al. |
| 5,657,408 A | 8/1997 | Ferm et al. |
| 5,932,397 A * | 8/1999 | Mustacich ..................... 430/321 |
| 6,195,478 B1 | 2/2001 | Fouquet |
| 6,278,534 B1 | 8/2001 | Arns |
| 6,621,972 B2 | 9/2003 | Kimerling et al. |
| 6,709,976 B1 | 3/2004 | Kamin et al. |
| 6,807,353 B1 * | 10/2004 | Fleming et al. ............... 385/132 |
| 6,834,131 B2 | 12/2004 | Tourne |
| 6,853,793 B1 | 2/2005 | Van Der Vliet et al. |
| 6,920,257 B1 * | 7/2005 | Mekis et al. ..................... 385/14 |
| 7,181,121 B2 * | 2/2007 | Kuramoto et al. ............ 385/132 |
| 7,609,931 B2 | 10/2009 | Logvin et al. |
| 8,265,445 B2 * | 9/2012 | Kim et al. ...................... 385/132 |
| 2003/0185534 A1 * | 10/2003 | Kaneko et al. ................ 385/129 |
| 2004/0201026 A1 | 10/2004 | Gill et al. |
| 2004/0208465 A1 | 10/2004 | Logvin et al. |
| 2004/0234222 A1 * | 11/2004 | Kuroda et al. ................ 385/129 |
| 2005/0105842 A1 | 5/2005 | Vonsovici et al. |
| 2007/0031083 A1 | 2/2007 | Logvin et al. |
| 2007/0082288 A1 | 4/2007 | Wright et al. |
| 2008/0044130 A1 * | 2/2008 | Pitwon ............................ 385/14 |

FOREIGN PATENT DOCUMENTS

| | | |
|---|---|---|
| EP | 397 337 | 11/1990 |
| EP | 883 000 | 12/1998 |
| JP | 2000-0338343 | 12/2000 |
| WO | 02/097491 | 12/2002 |
| WO | 2006/122429 | 11/2006 |

* cited by examiner

*Primary Examiner* — Charlie Peng
(74) *Attorney, Agent, or Firm* — Pillsbury Winthrop Shaw Pittman LLP

(57) ABSTRACT

An optical printed circuit board, including at least one optical waveguide for carrying optical signals on the optical printed circuit board; and a trench formed adjacent the at least one optical waveguide, wherein the trench contains a light absorptive material to absorb light that strays from the at least one waveguide.

15 Claims, 30 Drawing Sheets

Classical view of light rays bouncing within a waveguide

Evanescent optical wave

Exponential decay of 'evanescent tail'

OPTICAL PRINTED CIRCUIT BOARD, A METHOD OF MAKING AN OPTICAL PRINTED CIRCUIT BOARD AND AN OPTICAL WAVEGUIDE

The present invention relates to an optical printed circuit board, a method of making an optical printed circuit board and an optical waveguide.

Optical circuit boards are increasingly being used due to the fact that as compared to conventional copper circuit boards, cross-talk between different physical pathways on the circuit board is relatively small. However, optical cross-talk does occur and as the size of the optical waveguides used on such circuit boards is reduced and the relative spacing between waveguides is also reduced, cross-talk is expected to become more of a significant problem.

FIG. 1 shows a classical model of an optical signal propagating along an optical waveguide 2. In the classical model, a propagating optical signal 4 is fully constrained by total internal reflection signified in FIG. 1 by light rays being reflected within the waveguide. In practice, there will always be an amount of optical leakage. Most leaked light is lost due to scattering by the imperfect side walls of the core boundary. Optical leakage from one waveguide to adjacent waveguides is increased significantly on a bend in the waveguide with light radiating out of the outer edge of the bend. Light loss along a bend increases with decreasing bend radius. On an optical PCB subject to tight routing constraints, waveguides would typically need to undergo many tight bends and maintain a close separation to adjacent waveguides.

In addition, as an optical signal travels along the waveguide a small proportion of its energy travels outside the physical dimensions of the waveguide core. This energy is known as the evanescent wave and decays exponentially with distance away from the core boundary. The explanation for this deviation from the classical ray propagation model, in which all energy is contained within the core as long as the conditions for total internal reflection are satisfied, is that, due to the wave nature of the propagating optical energy, there can be no discontinuities in electric or magnetic field at the boundaries. This is analogous to the Schrödinger Wave Equation in Quantum Mechanics, in which the wave function of a particle trapped in a potential well cannot be discontinuous at the boundary (unless the potential well has infinite boundaries), giving rise to the phenomenon of Quantum Tunnelling. This is shown schematically in FIG. 2.

The part of the optical signal that propagates outside the physical dimension of the waveguide 2 forms part of the propagating optical signal and is mostly recovered at the destination. Therefore, using a light-absorbent cladding throughout would be undesirable as this would lead to very high loss in the optical signal as the parts of the optical signal propagating outside the core 2 of the waveguide would simply be absorbed.

One proposed way to address this problem is to increase the refractive index difference between the optical cladding and the optical core 2. However, this will increase the number of optical modes supported by the waveguide and therefore increase the signal pulse spreading and optical jitter. As optical printed circuit boards are designed for use at higher bit rates although it may seem beneficial to have as small a refractive difference between the core 2 and cladding as possible, this leads to higher optical leakage between waveguides, i.e. optical cross-talk.

One method of addressing this problem is disclosed in U.S. Pat. No. 6,853,793 and U.S. Pat. No. 6,621,972. Each of these discloses the use of an air trench provided between adjacent optical waveguides so as to reduce cross-talk between optical waveguides.

FIG. 3 shows a schematic representation of such an arrangement. As shown in FIG. 3, assuming the classical model of signal propagation, it can be seen that a refracted optical signal 6 will be incident on the cladding 8 of an adjacent waveguide. This could lead to cross-talk and although the presence of the air trench would reduce the cross-talk significantly due to the very high refractive index difference at the cladding trench boundary as compared to a situation in which no trench were provided, the solution is far from optimal.

US-A-2003/0185534 discloses an optical waveguide device having two or more optical waveguides, the device including a trench arranged between two of the waveguides for containing light absorbent material.

U.S. Pat. No. 4,883,338 and U.S. Pat. No. 5,381,505 disclose optical fibres including a coating which contains light absorbent material.

According to a first aspect of the present invention, there is provided an optical printed circuit board, comprising: at least one optical waveguide for carrying optical signals on the optical printed circuit board, the waveguide comprising an optical core surrounded by an optical cladding material; and a trench formed adjacent to the at least one optical waveguide, wherein the trench contains a matrix material having suspended therein light absorbent material to absorb light that strays from the at least one waveguide, in which the light absorbent material is selected to be light absorbent over a range of wavelengths from about 600 to about 1700 nm; and in which the concentration of light absorbent material within the trench is such that the combination of the light absorbent material with the matrix provides a heterogeneous mixture.

In this aspect, the provision of a heterogeneous mixture in the trench ensures that a PCB can be provided in which light leaving the cladding of the waveguide will effectively "see" no boundary as it enters the trench. In one embodiment this can be achieved by using the same material for the matrix as used for the waveguide cladding.

In an embodiment, there are at least two optical waveguides, and the trench is formed between the at least two optical waveguides thereby suppressing optical cross-talk between the at least two optical waveguides.

In an embodiment, the waveguides are formed from an optical core surrounded by an optical cladding material and wherein the trench contains an optical material having substantially the same refractive index as the cladding material surrounding the optical core of the waveguide.

In an embodiment, an optically absorbent material is suspended in optical material arranged within the trench.

In an embodiment, the optical absorbent material is selected from the group consisting of carbon, carbon powder . . . etc.

In an embodiment, each optical waveguide comprises a lower cladding, an optical core and an upper cladding, wherein the trench is provided in one or both of the upper cladding and the lower cladding.

In an embodiment, the waveguide is a multimode waveguide.

According to a second aspect of the present invention, there is provided a method of making an optical printed circuit board, the method comprising: forming a waveguide on a support layer, the waveguide comprising an optical core surrounded by an optical cladding; and forming a trench adjacent to the optical waveguide, and providing in the trench a light absorbent material suspended within a matrix material, the light absorbent material serving to absorb light that strays from the optical waveguide, in which the light absorbent material is selected to be light absorbent over a range of wavelengths from about 600 to about 1700 nm in which the concentration of light absorbent material within the trench is such that the combination of the light absorbent material with the matrix provides a heterogeneous mixture.

Again, the provision of a heterogeneous mixture in the trench ensures that a PCB can be provided in which light leaving the cladding of the waveguide will effectively "see" no boundary as it enters the trench.

In an embodiment, the method comprises locating in the trench a material having substantially the same refractive index as the optical cladding of the waveguide so as to ensure there is substantially no reflective optical boundary present to light by the interface between the trench and the cladding material surrounding the waveguide core.

In an embodiment, the method comprises forming at least two waveguides and forming a trench between the waveguides so as to separate the waveguides and suppress optical cross-talk between the at least two waveguides.

In an embodiment, the step of forming a trench comprises forming the actual trench and then filling the trench with a curable material; curing the curable material so as to solidify the material in the trench.

In an embodiment, the curable material provided in the trench is the liquid form of the material used to form the waveguide cladding with a light absorbent material suspended therein so as to ensure that when cured the light absorbent material is distributed within the material in the trench.

According to a third aspect of the present invention, there is provided a method of making an optical printed circuit board, the method comprising: forming a waveguide on a support layer, the waveguide comprising an optical core surrounded by an optical cladding; and forming a trench adjacent to the optical waveguide, and providing in the trench a light absorbent material to absorb light that strays from the optical waveguide, wherein the step of forming a trench comprises forming the actual trench and then filling the trench with a curable material; curing the curable material so as to solidify the material in the trench wherein the curable material provided in the trench is the liquid form of the material used to form the waveguide cladding with a light absorbent material suspended therein so as to ensure that when cured the light absorbent material is distributed within the material in the trench; in which the concentration of light absorbent material within the trench is such that the combination of the light absorbent material with the matrix provides a heterogeneous mixture.

According to a fourth aspect of the present invention, there is provided an optical printed circuit board, comprising: at least one optical waveguide for carrying optical signals on the optical printed circuit board; and a trench formed adjacent to the at least one optical waveguide, wherein the trench contains a light absorbent material to absorb light that strays from the at least one waveguide, in which the light absorbent material is selected to be light absorbent over a range of wavelengths from about 600 to about 1700 nm; the trench including one or more sloped side walls.

By providing a trench with sloped walls, light that impinges on the outer wall of the trench and that is not received into the trench, i.e. that reflects from the wall, will not be directed back towards the waveguide from where it originally leaked.

In an embodiment, the slope of the sloped side walls is curved such that the trench has the form of an inverted bell.

In an embodiment, the slope of the sloped side walls is flat such that the trench has the form of an inverted truncated triangle.

In an embodiment, the concentration of light absorbent material within the trench varies with depth in the trench.

In an embodiment, the concentration of light absorbent material within the trench varies in dependence on the width of the trench at any particular depth.

According to a fifth aspect of the present invention, there is provided an optical printed circuit board, comprising: at least one optical waveguide for carrying optical signals on the optical printed circuit board; and a trench formed adjacent to the at least one optical waveguide, wherein the trench contains a light absorbent material to absorb light that strays from the at least one waveguide, in which the light absorbent material is selected to be light absorbent over a range of wavelengths from about 600 to about 1700 nm; in which in a region in the trench adjacent the boundary with the waveguide there is substantially no light absorbent material.

This ensures that it is possible to provide a trench that has a boundary which is effectively invisible to light passing through. This is the case where, for example, the same material is used in the trench as that used for a matrix material within which light absorbent particles are provided so as to form the light absorbent material.

In an embodiment, the thickness of the region that has substantially no light absorbent material is at least 2 microns. In another embodiment, the thickness of the region that has substantially no light absorbent material is at least 5 microns or at least 10 microns.

In an embodiment, there are at least two optical waveguides and the trench is provided between the two optical waveguides, wherein the concentration of light absorbent material varies across a width of the trench between the two waveguides in a substantially Gaussian or quasi-Gaussian manner.

According to a sixth aspect of the present invention, there is provided an optical printed circuit board, comprising: at least one optical waveguide for carrying optical signals on the optical printed circuit board, the waveguide comprising an optical core surrounded by an optical cladding material and defining a longitudinal direction for propagation of light; and a trench formed adjacent to the at least one optical waveguide, wherein the trench contains a matrix material having suspended therein light absorbent material to absorb light that strays from the at least one waveguide, in which the concentration of light absorbent material varies within the trench in one or more of: a direction transverse to the longitudinal direction for propagation of light; and with depth in the trench.

Varying the concentration of light absorbent material within the trench enables the operation of the trench to be controlled and/or optimised for specific applications.

According to a seventh aspect of the present invention, there is provided a method of making an optical printed circuit board, the method comprising: forming a waveguide on a support layer, the waveguide comprising an optical core surrounded by an optical cladding; and forming a trench adjacent to the optical waveguide, and providing in the trench a light absorbent material suspended within a matrix material, the light absorbent material serving to absorb light that strays from the optical waveguide; wherein the step of forming the trench comprises forming a trench that includes one or more sloped side walls.

In an embodiment, the step of forming the trench that includes one or more sloped side walls, comprises using a laser to etch or ablate material from a trench region, the laser having a non-uniform intensity profile to thereby form the one or more sloped side walls.

In an embodiment, the laser has a Gaussian or quasi-Gaussian intensity profile.

In an embodiment, the step of forming the trench that includes one or more sloped side walls, comprises providing curable optical material in a trench region; and curing the optical material in the trench region using a photolithographic mask having a transmission profile that corresponds to the desired slope of the side walls of the trench.

In an embodiment, the step of forming the trench that includes one or more sloped side walls, comprises providing curable optical material in a trench region; and applying curing radiation using an intensity profile that corresponds to the desired slope of the side walls of the trench.

In an embodiment, method comprises: controlling provision of material in the trench such that the concentration of light absorbent material suspended within the matrix material varies across or with depth in the trench.

In an embodiment, the method comprises: providing optical matrix material in the trench; providing light absorbent material to the trench; waiting a determined period of time for the light absorbent material to settle prior to curing the material in the trench.

In an embodiment, a period is waited prior to curing such that the concentration of light absorbent particles is higher at the bottom of the trench than at the top.

According to an eighth aspect of the present invention, there is provided, a method of making an optical printed circuit board, the method comprising: forming two or more waveguides on a support layer, each of the waveguides comprising an optical core surrounded by an optical cladding; and forming a trench between the optical waveguides, and providing in the trench a light absorbent material to absorb light that strays from the optical waveguide, wherein the step of forming a trench comprises forming the actual trench and then filling the trench with a curable material; curing the curable material so as to solidify the material in the trench wherein the curable material provided in the trench is the liquid form of the material used to form the waveguide cladding with a light absorbent material suspended therein so as to ensure that when cured the light absorbent material is distributed within the material in the trench; controlling the distribution of light absorbent material within the trench such that it varies in a direction transverse to the longitudinal axis of the trench and/or with depth within the trench.

In an embodiment, the concentration of light absorbent material varies in a substantially Gaussian or quasi-Gaussian distribution in a direction transverse to the longitudinal axis of the trench.

In an embodiment, the method comprises providing the matrix material within the trench and subsequently providing light absorbent material using dry deposition of light absorbent material.

In an embodiment, the method comprises providing material to the trench from plural reservoirs having determined concentrations of light absorbent material so as to achieve the desired variation in concentration within the trench.

According to a ninth aspect of the present invention, there is provided a method of making an optical printed circuit board, the method comprising: forming two or more waveguides on a support layer, each of the waveguides comprising an optical core formed on a lower cladding; and forming an upper cladding layer including a light absorbent material to absorb light that strays from the optical waveguide, wherein the step of forming the upper cladding, comprises applying cladding material in a desired pattern, such that regions surrounding the optical cores do not contain light absorbent material, and wherein a region containing light absorbent material is formed between the two or more waveguides.

In an embodiment, method comprises forming the upper cladding layer using plural nozzles connected to reservoirs of corresponding.

In an embodiment, at least one nozzle is connected in use to a reservoir containing cladding material doped with light absorbent material.

According to a further aspect of the present invention, there is provided an optical printed circuit board, comprising at least one optical waveguide for carrying optical signals on the optical printed circuit board; and a trench formed adjacent to the at least one optical waveguide, wherein the trench contains a light absorptive material to absorb light that strays from the at least one waveguide.

The invention in this aspect provides an optical printed circuit board in which a region is provided between adjacent optical waveguides which has arranged therein a light-absorbent material. Thus, the refracted (or, if the material used to fill the trench is the same as the cladding material, simply transmitted) optical signal 6 will be absorbed by the light-absorbent material arranged within the region adjacent to the waveguide and the cross-talk will therefore be reduced.

Preferably, the region between optical waveguides is formed as a trench and the trench is preferably filled with a material having the same refractive index as that of the optical cladding 7 provided on the optical waveguide.

If a material is used in the trench that has a refractive index different from that of the cladding of the optical waveguide, partial reflection will occur at the boundary between the cladding and the material in the trench. In effect, this creates a secondary waveguide of greater dimensions than the original internal waveguide 2. At every boundary between two materials of different refractive index, an optical signal will be partially refracted and partially reflected.

Therefore, if an unfilled trench is fabricated between the waveguides, some light will inevitably be reflected back into the waveguide core from which it originated. As mentioned before, this has the effect of creating a secondary waveguide which will give rise to greater optical jitter and noise as a higher number of modes of optical signal propagation will be supported. If the trench is filled with a material e.g. black ink, then although any light which has penetrated the boundary will be absorbed, some light will again be reflected back into the waveguide if the black ink has a significantly different refractive index to that of the cladding of the waveguide. Only if the trench is filled with a material with substantially the same refractive index as the cladding will there be virtually no reflection. This is due to the fact that the signal "sees" no boundary.

If the material in question is in turn doped with light absorbent impurities then the uninterrupted signal will eventually be absorbed. Thus, there will be no reflection of the optical signal at the boundary between the cladding and the trench material and there will also be no onwards transmission of a refracted signal to an adjacent waveguide since the optical signal in the trench will be absorbed. Cross-talk will be significantly reduced or even eradicated whilst increased jitter will not occur as the waveguide effective size will not be increased.

Preferably, the waveguides are formed from an optical core surrounded by an optical cladding material and wherein the trench contains an optical material having substantially the same refractive index as the cladding material surrounding the optical core of the waveguide. This has the effect that light that leaves the or each of the optical waveguides experiences substantially no optical boundary as it leaves the waveguides.

Preferably, the waveguides are formed of polymer.

According to a further aspect of the present invention, there is provided a method of making an optical printed circuit board, the method comprising forming a waveguide on a support layer, the waveguide comprising an optical core surrounded by an optical cladding; and forming a trench adjacent to the optical waveguide, wherein the trench contains a light absorptive material to absorb light that strays from the optical waveguide.

A method is provided of making an optical printed circuit board which has the effect of significantly reducing if not entirely eliminating cross-talk between adjacent waveguides on an optical printed circuit board. The method requires forming a trench or region adjacent to the first optical waveguide, the trench being provided with a light absorptive material to absorb light as it strays from the optical waveguide. Thus, a high proportion of the light that is refracted as it traverses the boundary between the trench and the optical cladding of the waveguide, will be absorbed and will not be able to propagate onwards to an adjacent waveguide thus contributing to cross-talk.

Preferably, the method requires locating in the trench a material having substantially the same refractive index as the optical cladding of the waveguide. This has the advantage that substantially no reflective optical boundary is presented to light by the interface between the trench and the waveguide. Thus, not only is the light that traverses the boundary absorbed by the light absorptive material within the trench, but in addition there is no reflection at the boundary so that the effective size of the waveguide is not increased. Thus, no more modes of transmission will be supported than are supported by the original waveguide and therefore optical signal integrity is not further degraded.

According to a further aspect of the present invention, there is provided an optical printed circuit board, comprising at least one optical waveguide for carrying optical signals on the optical printed circuit board; and a trench formed adjacent to the at least one optical waveguide, wherein the trench contains a light absorptive material to absorb light that strays from the at least one waveguide, in which the light absorbent material is selected to be light absorbent over a range of wavelengths from about 500 to 1700 nm.

According to a further aspect of the present invention, there is provided a method of making an optical printed circuit board, the method comprising: forming a waveguide on a support layer, the waveguide comprising an optical core surrounded by an optical cladding; and forming a trench adjacent to the optical waveguide, and providing in the trench a light absorbent material to absorb light that strays from the optical waveguide, wherein the step of forming a trench comprises forming the actual trench and then filling the trench with a curable material; curing the curable material so as to solidify the material in the trench wherein the curable material provided in the trench is the liquid form of the material used to form the waveguide cladding with a light absorbent material suspended therein so as to ensure that when cured the light absorbent material is distributed within the material in the trench.

It will be appreciated that any one or more of the features described above as being provided "in an embodiment" or "preferably", may be provided in combination with any one or more other such features together with any one or more of the aspects of the invention.

Examples of the present invention will now be described in detail with reference to the accompanying drawings, in which.

Figure 1:
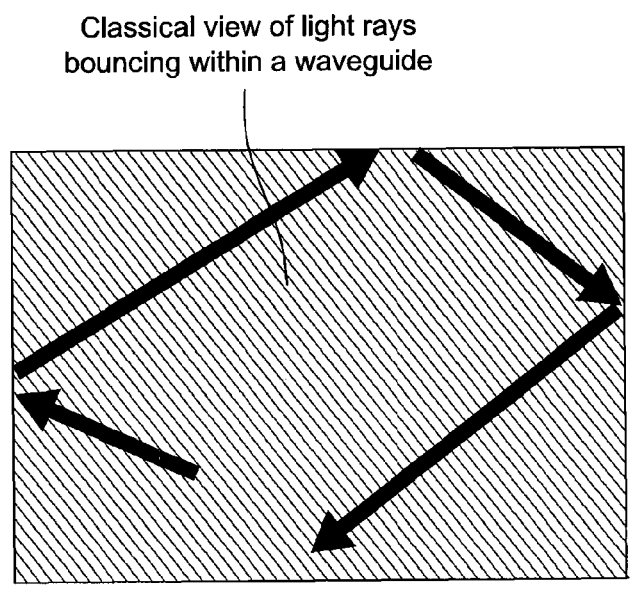
FIG. 1 shows a schematic cross-sectional representation of signal propagation inside a waveguide core.
Figure 2:
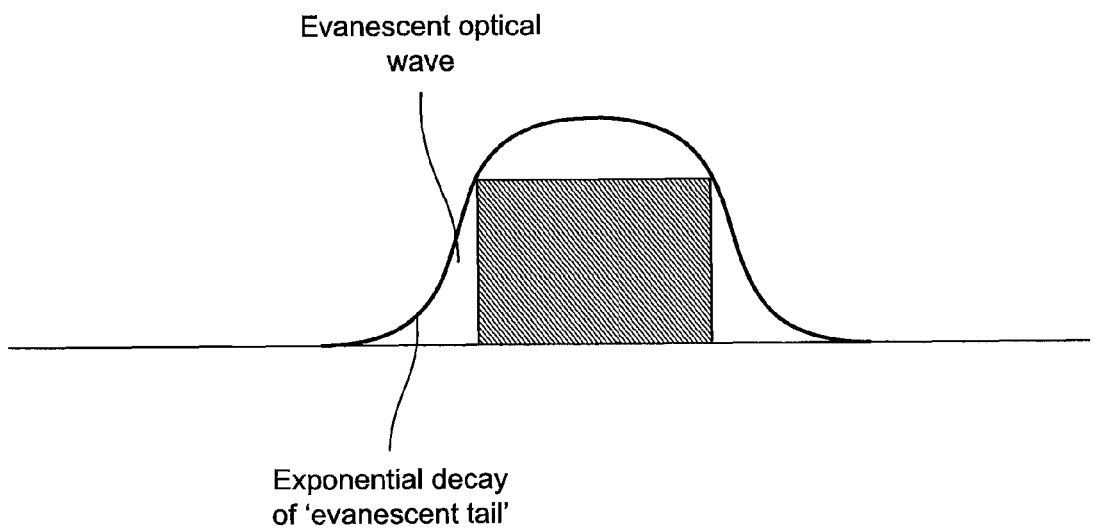
FIG. 2 shows schematic cross-sectional representation of the fundamental mode optical signal intensity distribution within an optical waveguide core.
Figure 3:
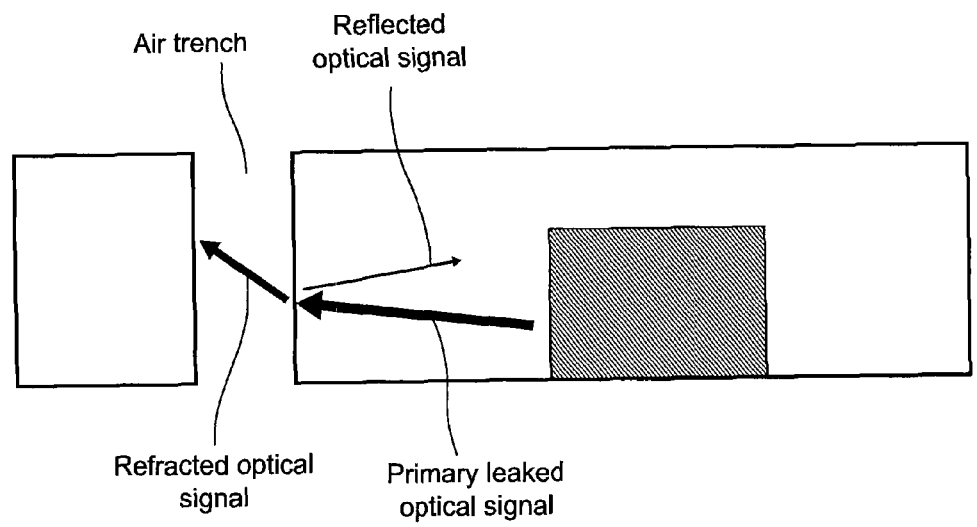
FIG. 3 shows a schematic representation of a cross-section through an optical printed circuit board.
Figure 4:
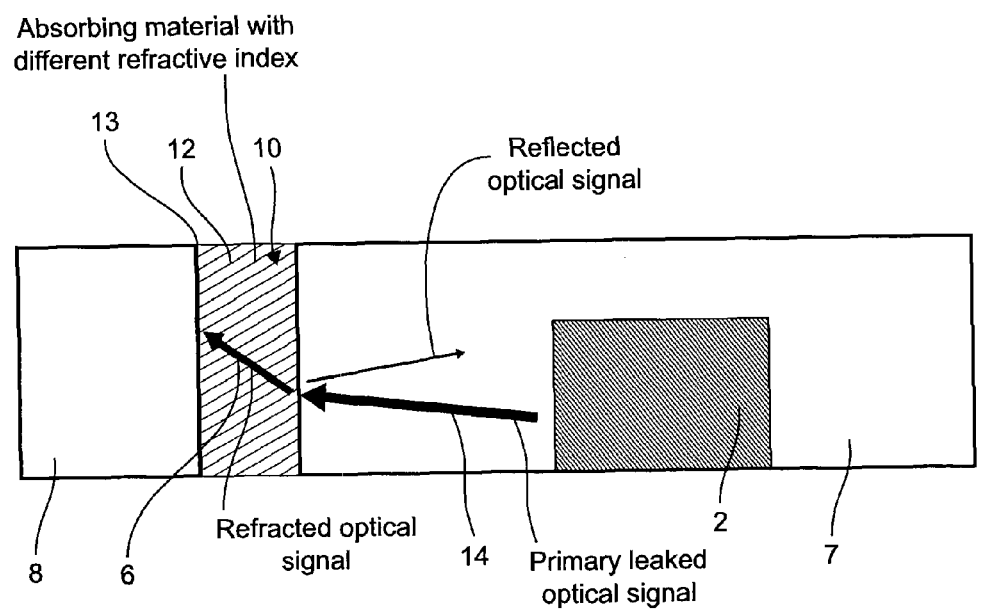
FIG. 4 shows a schematic representation of a cross-section through an optical printed circuit board.

FIG. 4 shows a schematic representation of a cross-section through an optical printed circuit board according to an embodiment of the present invention. The circuit board may comprise one or more support layers (not shown). The circuit board comprises an optical waveguide having a core 2 surrounded by a cladding 7. A region 10, such as a trench, adjacent to the waveguide is provided with a material 12 that is selected to be light absorbent. The light absorbent material therefore has the effect of absorbing any optical signal 6 that may leak from the waveguide.

As shown in the Figure, a primary leaked optical signal 14 is incident upon the boundary between the cladding 7 and the region 10. A reflective optical signal 16 is generated as is a refracted optical signal 6. If the refracted optical signal 6 were merely allowed to propagate freely, then it would be quite likely to impinge upon the cladding 8 of an adjacent optical waveguide thus leading to cross-talk. The presence of a light absorbent material in the region 10 substantially reduces or eliminates the refracted optical signal caused by the leaked optical signal 14 being incident upon the boundary 13.

In one embodiment the waveguide is a single mode waveguide. In another embodiment the waveguide is a multimode waveguide. Use of a multimode waveguide means that the waveguide can be much larger and therefore manufacture can be easier and cheaper. Furthermore connection of another optical component to the waveguide is significantly easier.

It is preferred that the waveguides are made of a polymer. This enables simple manufacturing techniques to be used.

Figure 5:
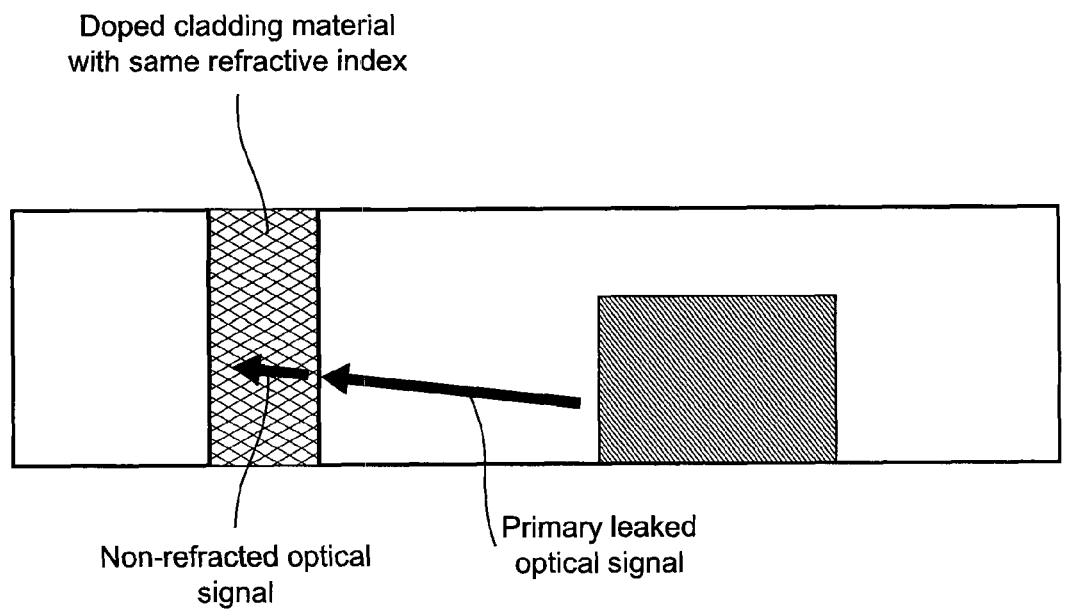
FIG. 5 shows a schematic representation of a cross-section through an optical printed circuit board.

FIG. 5 shows a cross-section through a further example of an optical printed circuit board. Again, the support layer(s) is not shown. Although the example shown in FIG. 4 works well to reduce or suppress optical cross-talk, the presence of the reflected optical signal 16 can in some cases be undesirable as jitter may be introduced. This is because a secondary waveguide is effectively produced which extends across the entire cross-section of the cladding 7 together with the core 2. Thus, more modes of transmission will be supported and jitter can be introduced due to dispersion of a propagating optical signal.

In the examples shown in FIG. 5 this issue is addressed as the primary leaked optical signal 14 will not be reflected at all at the boundary 13 between the region 10 and the cladding 7 of the waveguide. This is because the material selected to be arranged in the region 10 has substantially the same refractive index as that of the cladding 7.

Figure 6:
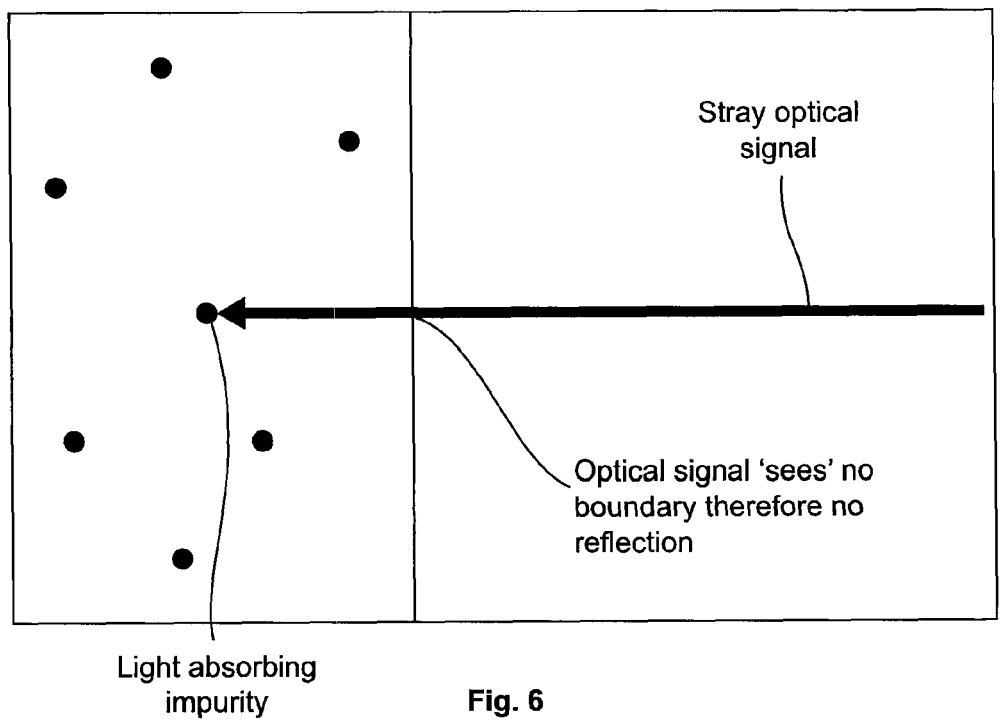
FIG. 6 shows a schematic representation of a boundary between an optical waveguide and a trench adjacent to the waveguide.

Referring to FIG. 6, since the material in the region 10 has the same refractive index as the material of the cladding 7 a stray optical signal 14 will effectively "see" no boundary between the two regions (the region 10 and the cladding 7). Thus, there will be no total internal reflection at the boundary and all the light from the stray optical signal will propagate outwards into the region 10. To ensure that there is substantially no cross-talk due to onward propagation of the stray optical signal 14 a light absorbent impurity is provided within the region 10. It is preferred that the distribution of light absorbent impurities is such that at the physical boundary between the cladding and the trench, and for a small distance into the trench there are very few light absorbent impurities. Thus the effect of the light absorbent impurities on the bulk effective refractive index of the trench will be negligible in this region which may extend for a few microns, say up to 15 microns.

Examples of material suitable for use as the light absorbent impurities include carbon and other light absorbent materials. One particular option would be nano-carbon with a particle diameter in the range 10 to 50 nm. Another carbon option would be a carbon powder such as graphite having a particle size in the range 1 to 10 μm. Use of such a material is particularly advantageous due to its low cost. As will be explained below, as a coarser dopant a shorter settle time would ensue this would therefore require that the suspension be applied and cured after a limited time after the diffusion.

It is preferred that the light absorbent material is suitable for absorbing light of a large range of wavelengths, e.g. 600 to 1700 nm. Preferably, the light absorbent material is suitable for absorbing light of the range of wavelengths from 600 to 1700 nm or 800 to 1550 nm This means that irrespective of communications signal wavelength, the light absorbent properties of the absorbent material will provide the desired beneficial effects, e.g. crosstalk suppression. This enables multiple signal wavelengths to be used in the same system without any significant variation in crosstalk in dependence on signal wavelength.

Examples of a method of manufacturing the printed circuit board will now be described in detail with reference to FIGS. 7A to 7K.

Figure 7A:
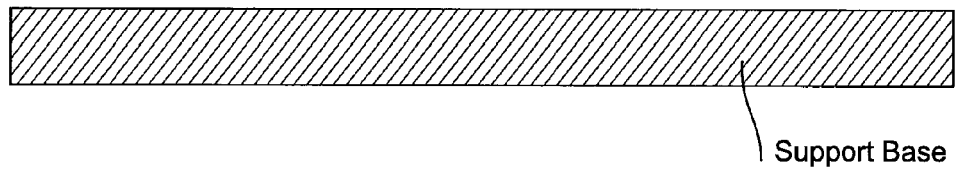
FIGS. 7A to 7K show stages in a method of manufacture of an optical printed circuit board.
Figure 7B:
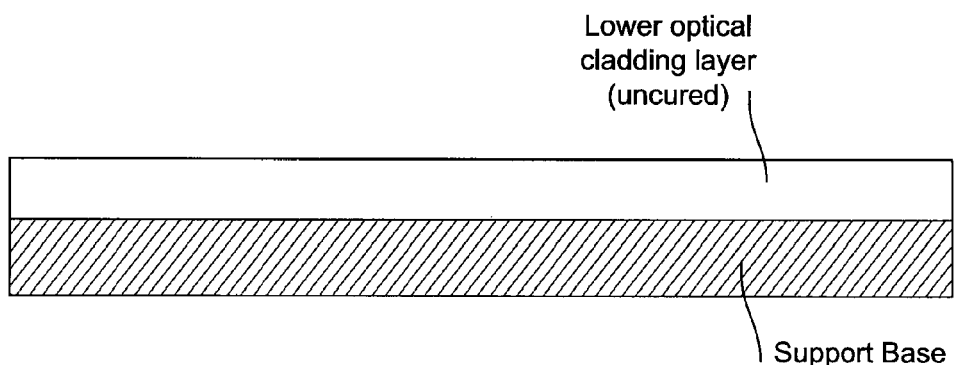

Referring to FIG. 7A, initially a support base 20 is provided. The base 20 may be any suitable material but typically is a material such as FR4 or Kapton Polyimide. In FIG. 7B, a layer of uncured material 22 is provided on the base 20. The material 22 is typically a polymeric material suitable for use as an optical cladding. In the example, the polymeric material is curable with ultra-violet light. That is it remains in a liquid form until UV light is applied to it.

In a negative curable material, those portions of the material exposed to curing radiation will become insoluble to developer (e.g. solvents), while those portions not exposed to light can be removed with a developer. Therefore the mask will allow light to pass through in those areas which are to form the waveguide structures.

In a positive curable material, those portions of the material NOT exposed to curing radiation will become insoluble to developer (e.g. solvents), while those portions exposed to light can be removed with a developer. Therefore the mask will block only those areas from light which are to form the waveguide structures.

Negative curable optical polymer material is more common and therefore all manufacturing methods described within this document relate to negative curable material. It will be appreciated however that this is one possible preferred example and positive curable materials can be equally deployed to form optical waveguide and cladding structures.

Figure 7C:
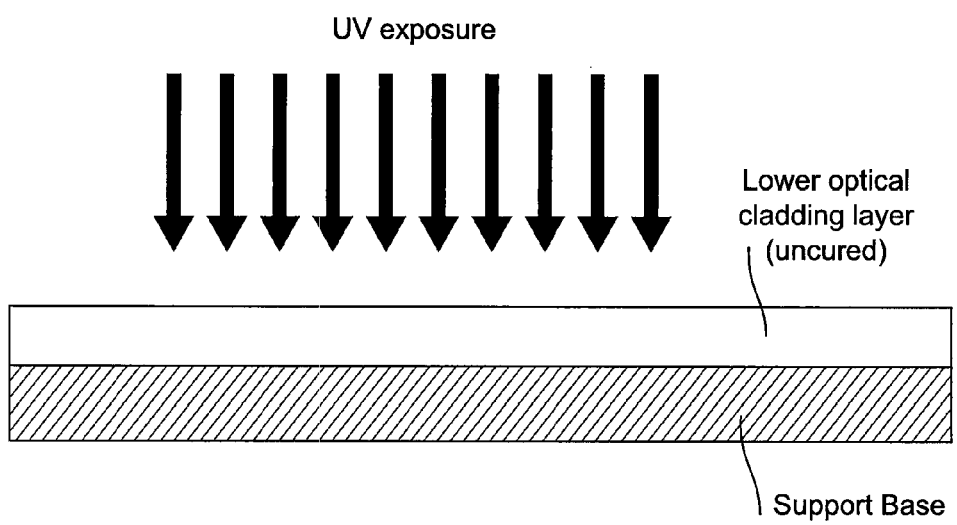
Figure 7D:
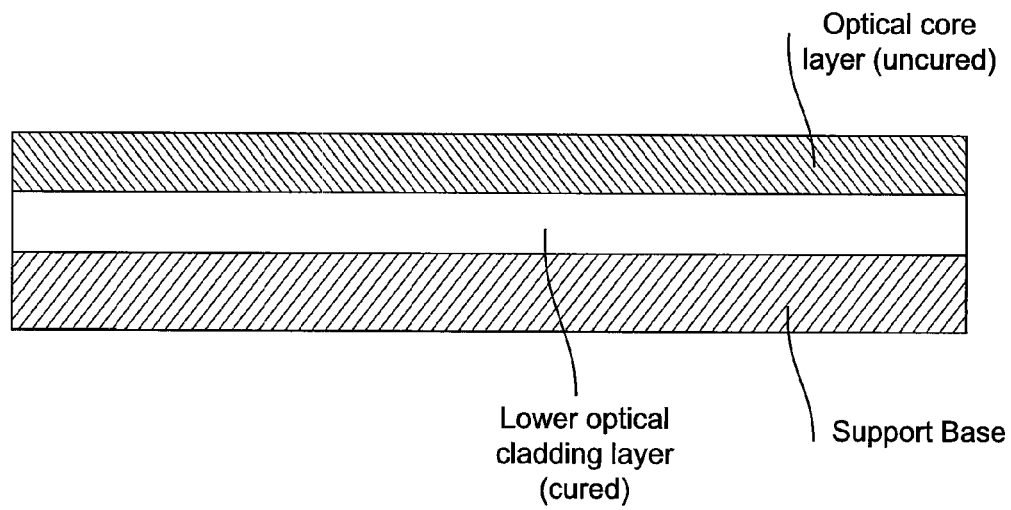

Upon irradiation by UV light, molecular crosslinking is stimulated causing the material to harden. In FIG. 7C, the lower optical cladding layer 22 is cured through the exposure of ultraviolet radiation 26. Once cured, an optical core layer 28 is provided on the cured lower cladding layer 24 (FIG. 7D).

Figure 7E:
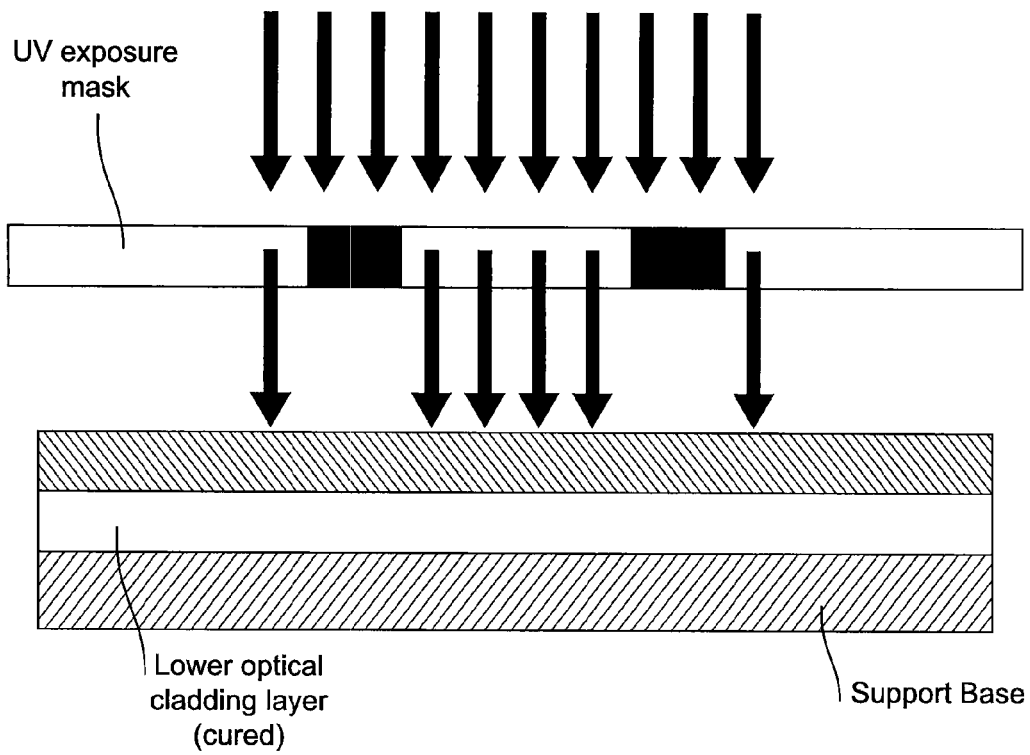

In the example shown the optical core layer is composed of a UV-curable polymeric material with a slightly higher refractive index than the material composing the cladding. In FIG. 7E, a mask 30 is provided above the uncured optical core layer 28 and again the entire structure is irradiated with ultra-violet radiation through the mask 30.

Exposed regions of the uncured optical core layer are cured by the ultraviolet radiation.

Figure 7F:
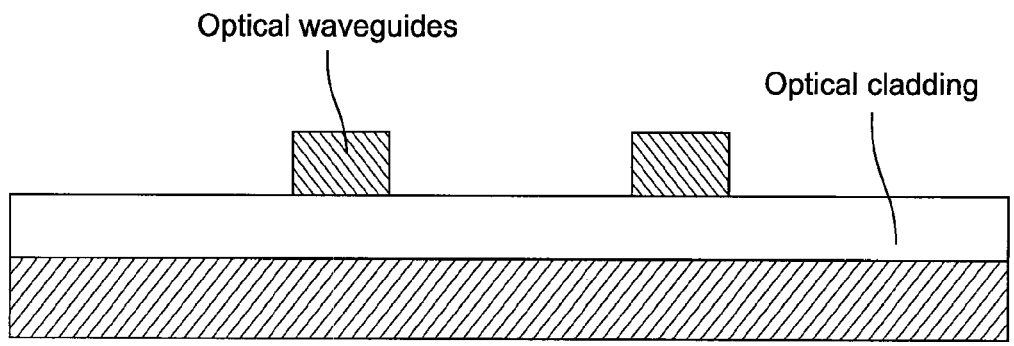
Figure 7G:
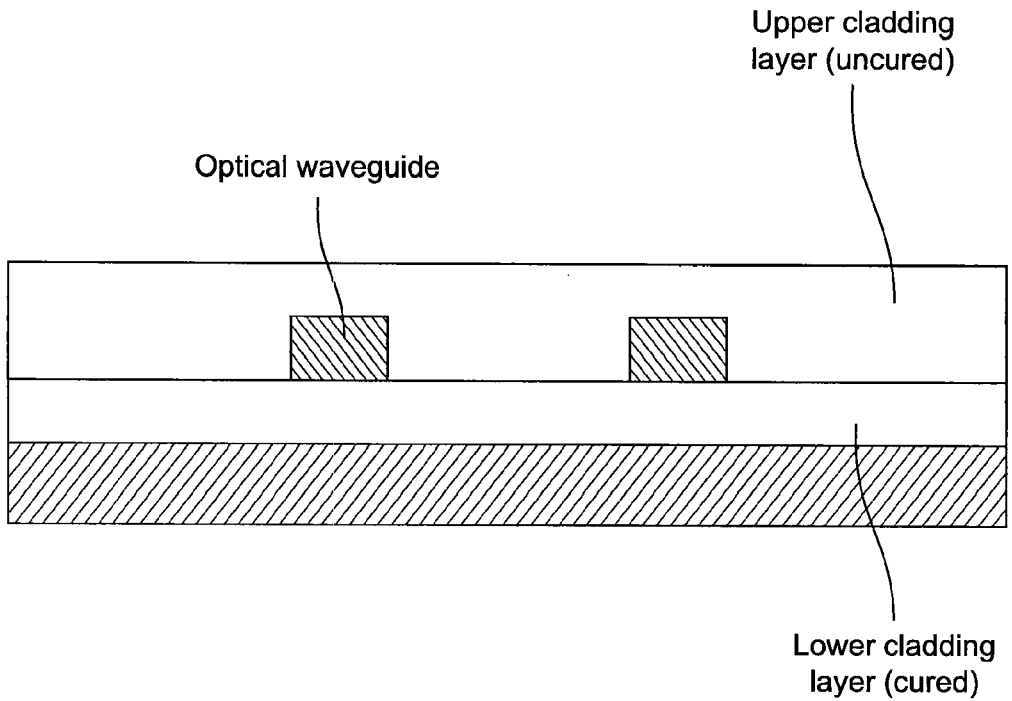

Referring to FIG. 7F, the uncured optical core material may be removed leaving the structures 32 that define the core of the optical waveguides. Next, as shown in FIG. 7G, a layer of uncured upper cladding material 34 is provided to cover the waveguide cores 32. Again, a mask is arranged over the resultant structure and the mask is irradiated with ultraviolet radiation. A desired region of the upper cladding layer 34 is maintained uncured whilst the rest of the area is cured so as to leave a desired region as a liquid.

Figure 7H:
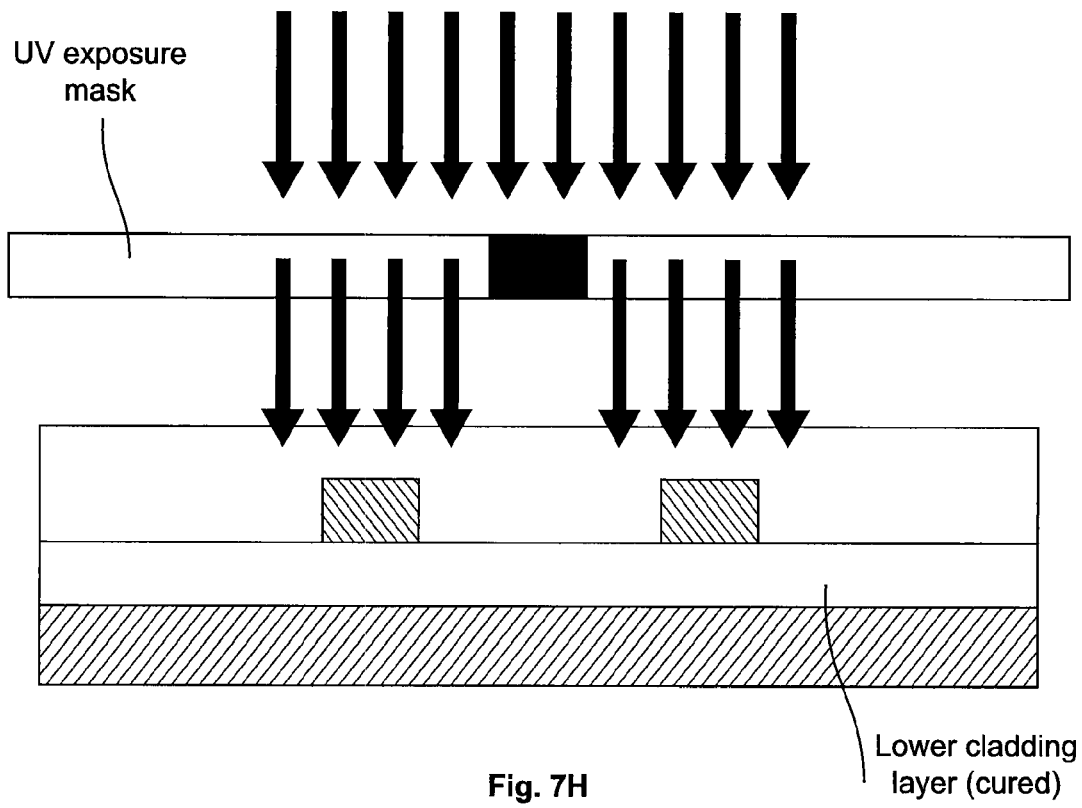
Figure 7I:
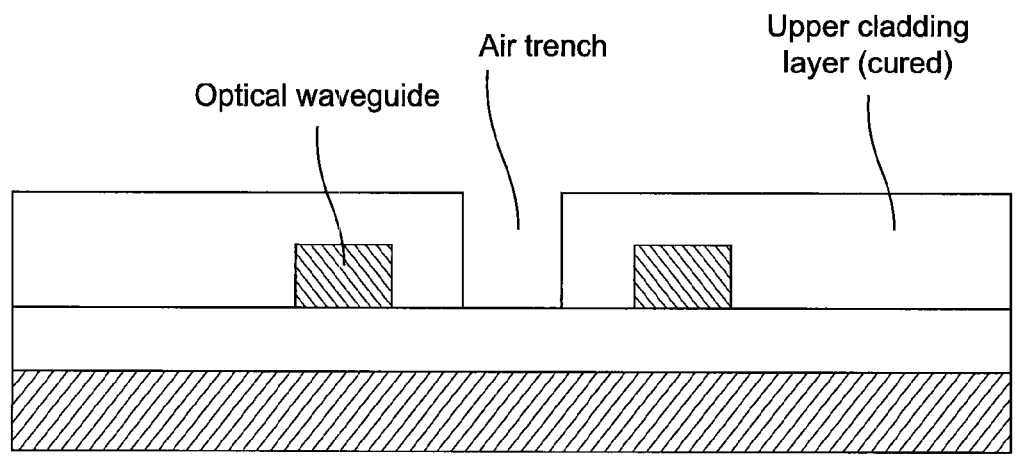

Next, as shown in FIG. 7I, the uncured region is removed, e.g. by washing with solvent and a trench or region 36 is formed between the waveguides having optical cores 32.

Figure 7J:
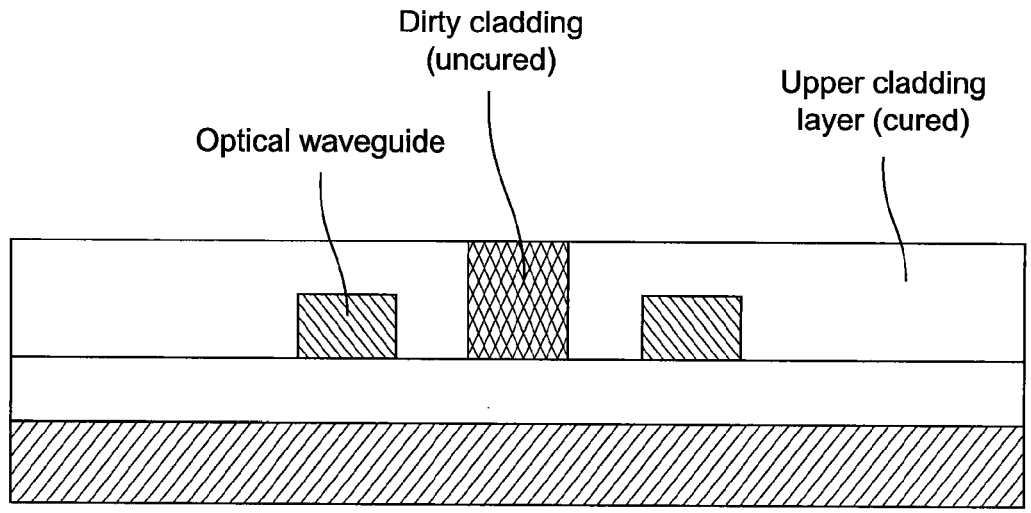

Thus, in FIG. 7J, a cladding material is provided within the region 36. The material in the region 36 is preferably the same material used to form the upper cladding layers of the waveguides except that it is doped with a light absorbent material. Typically, the light absorbent material may be carbon in the form of a powder or nano particles.

Figure 7K:
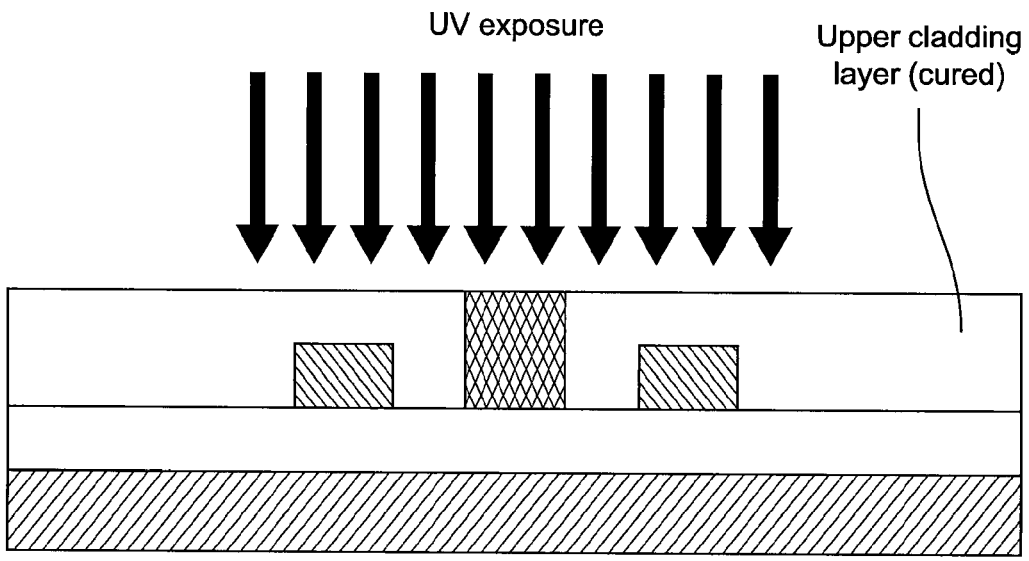

To form the region 36, a suspension of the uncured cladding material is made with the light absorbent material. This is then applied in the trench 36 and cured (FIG. 7K). The intensity of radiation used to cure the material is selected to be sufficiently strong to ensure that it can propagate all the way through the depth of the region 36 to ensure that the doped cladding material towards the bottom (i.e. closest to the lower cladding layer) is cured as well as the region towards the upper end of the region 36.

Figure 8:
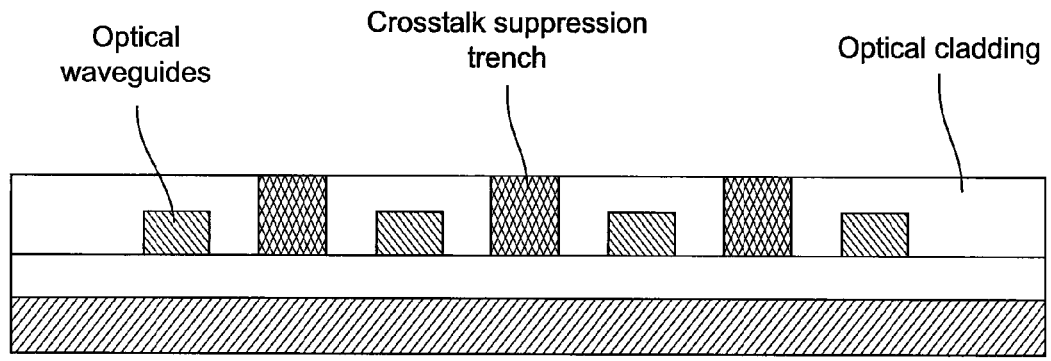
FIGS. 8 to 10 show examples of schematic representations of cross-sections through optical printed boards.

FIG. 8 shows an example of an optical printed circuit board having four waveguides. In this example, each of the waveguides is separated by a trench 38 in which a doped cladding material is provided. The cladding material within the trenches 38 is doped with a light absorbent material such that stray light from one of the waveguides will be absorbed before it can interfere with an optical signal propagating along an adjacent waveguide.

As in the example described above, the material in which the dopant is suspended is preferably of the same or similar refractive index to that of the optical cladding 34. This means that an optical signal propagating through the optical cladding 34 and into one of the regions 38 will not "see" a boundary and therefore no partial reflection will occur.

Figure 9:
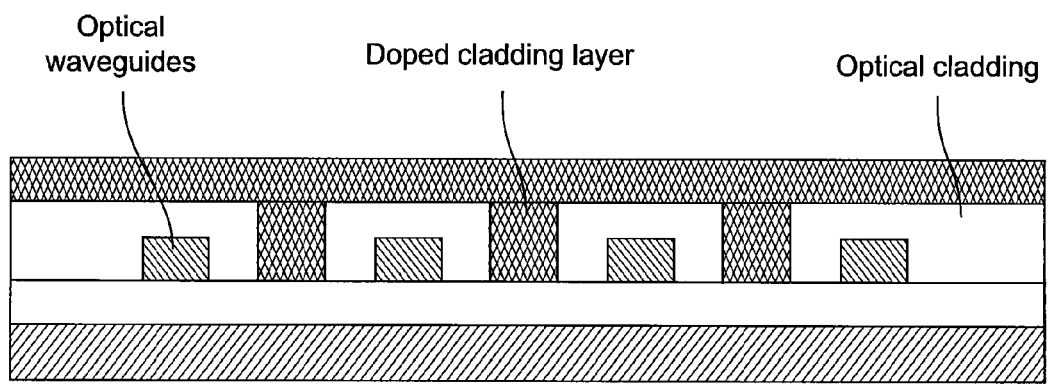
Figure 10:
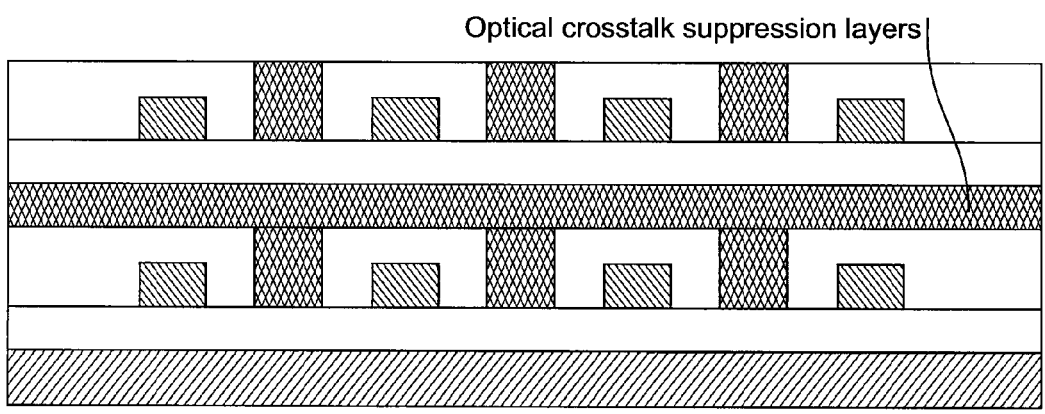

FIG. 9 shows a cross-section through another example of an optical printed circuit board. Like for example FIG. 8, plural waveguides are provided, each being separated by a trench 38 filled with a doped cladding layer. In the example of FIG. 9, a layer of doped cladding material is then formed over the entire resultant structure. Referring to FIG. 10, a second layer of optical waveguides may then be formed on top of the layer of doped optical cladding. This provides vertical as well as horizontal optical separation and optical isolation between waveguides enabling multiple-layered waveguide structures to be used without the risk of increased optical cross-talk.

Figure 11:
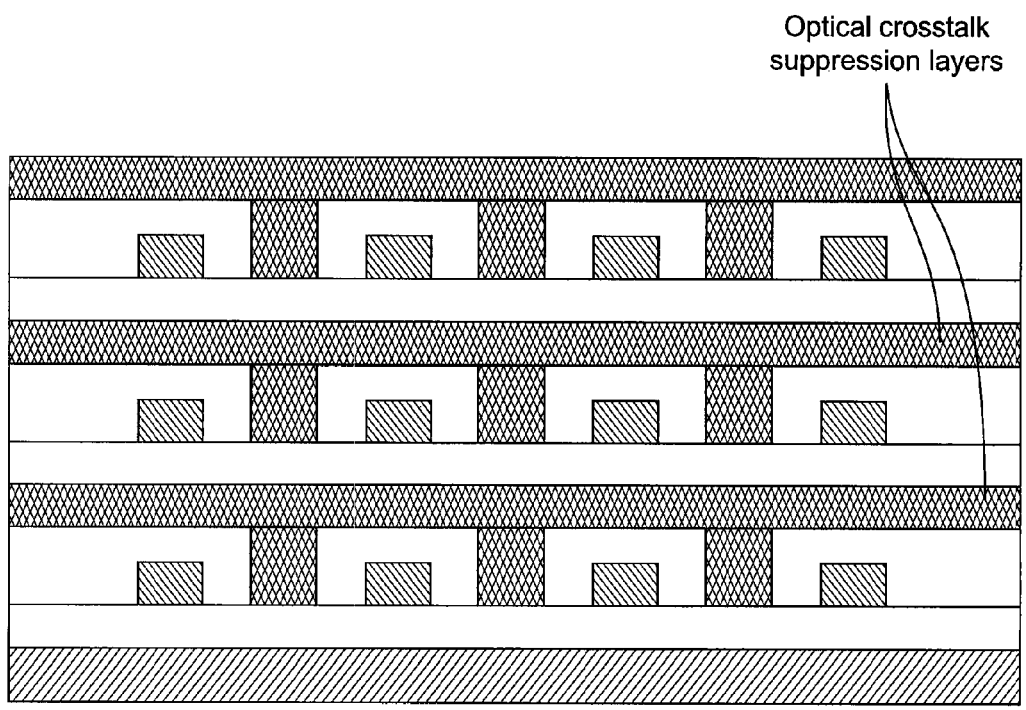
FIG. 11 shows a cross-section through an example of an optical printed circuit board.

FIG. 11 shows another example of such a construction. In the example of FIG. 11, three layers of four waveguides are provided.

Occasionally, during manufacture of an optical printed circuit board as described above with reference to FIGS. 7A to 7J, it is possible that a thin layer of core material deposits uniformly along the top surface of the lower cladding. This may occur as a result of error in the ultraviolet exposure techniques used to cure the lower cladding and/or the waveguide core itself Such a thin layer of core material can lead to a substantial amount of optical leakage. The trenches described above would not prevent this because the thin layer is created during the core layer curing process and the trench features would simply build on top of the core.

Referring to FIGS. 12A to 12I, an example of a slightly modified method of making an optical printed circuit board is described, in which, when the lower cladding layer 24 is cured, instead of applying a uniform ultraviolet irradiation, an exposure mask substantially the same as that shown in FIG. 7H described above, is used.

Figure 12A:
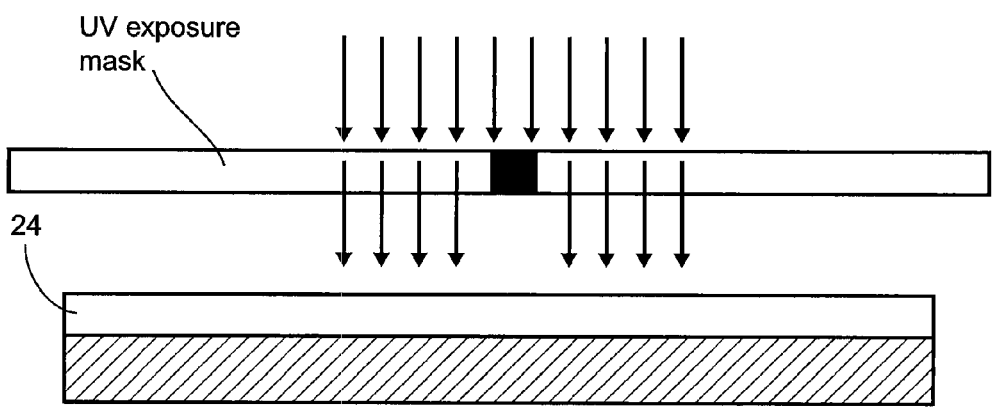
FIGS. 12A to 12I show stages in a method of manufacture of an optical printed circuit board.
Figure 12B:
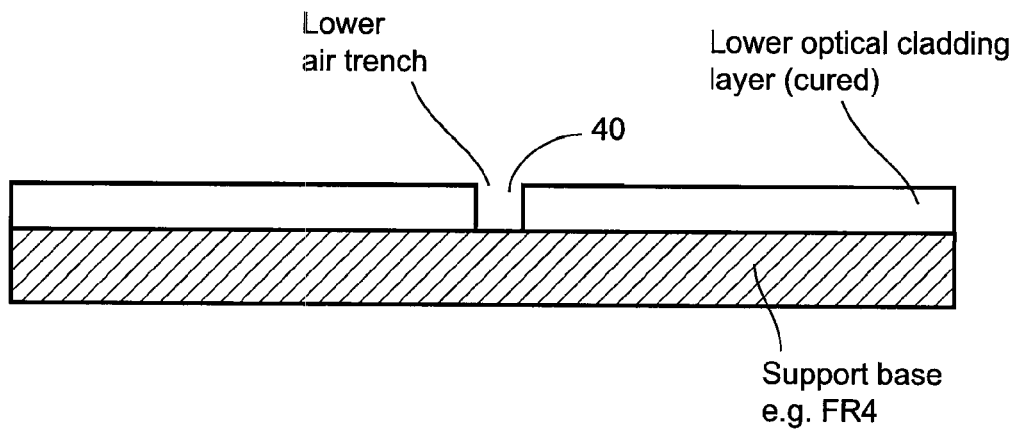
Figure 12C:
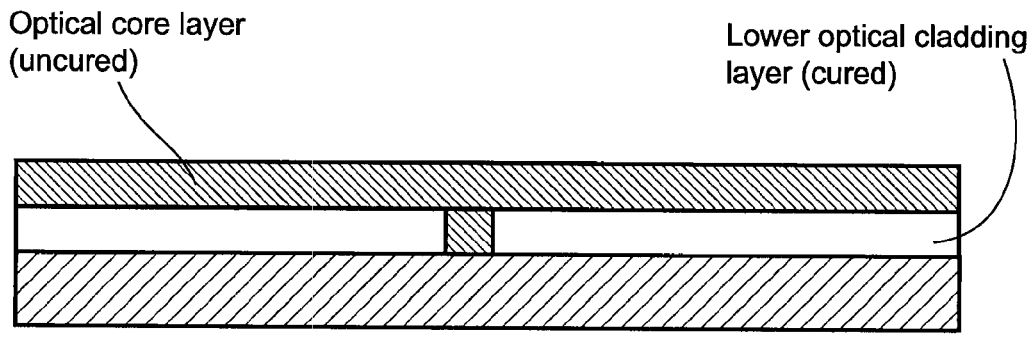
Figure 12D:
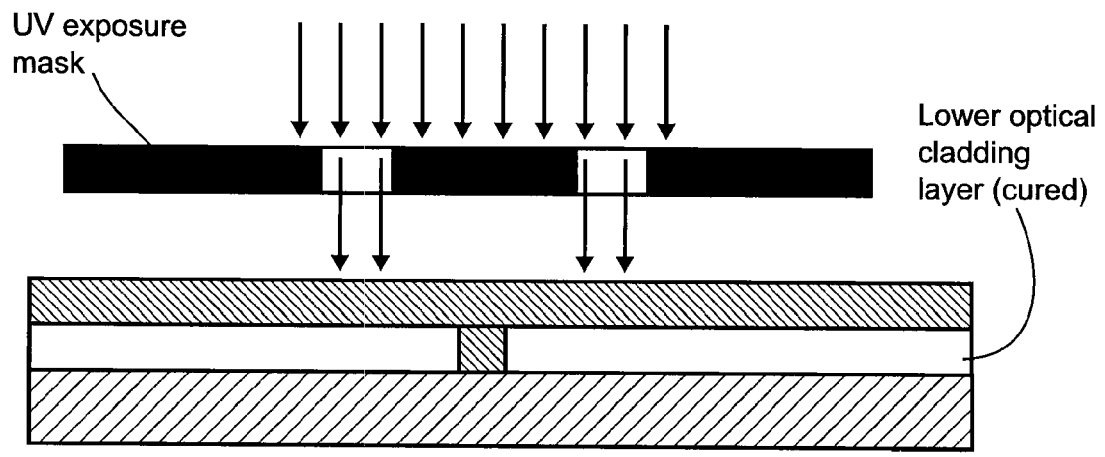
Figure 12E:
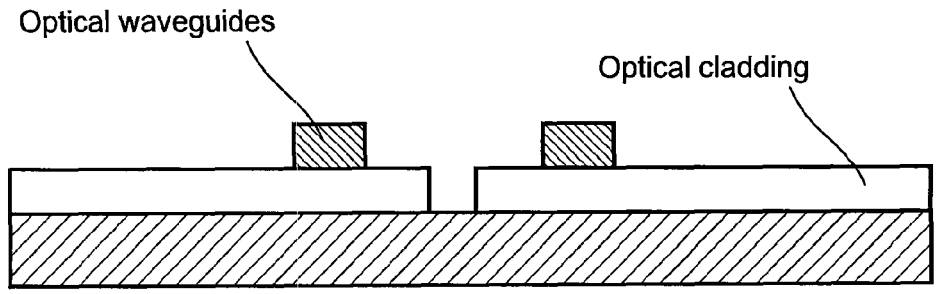

As shown in FIG. 12B, a region, in this case a trench 40, is formed in the lower cladding layer 24. Next, as shown in FIG. 12C, the uncured optical core layer material is provided on the resultant structure. As shown in FIG. 12D, an exposure mask is applied to form the optical waveguide cores. In the step shown in FIG. 12E, the uncured cladding material is washed away or otherwise removed leaving a structure shown.

Figure 12F:
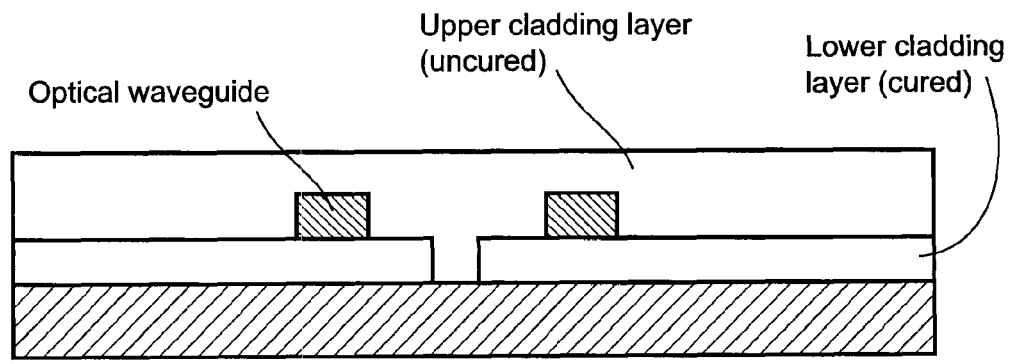
Figure 12G:
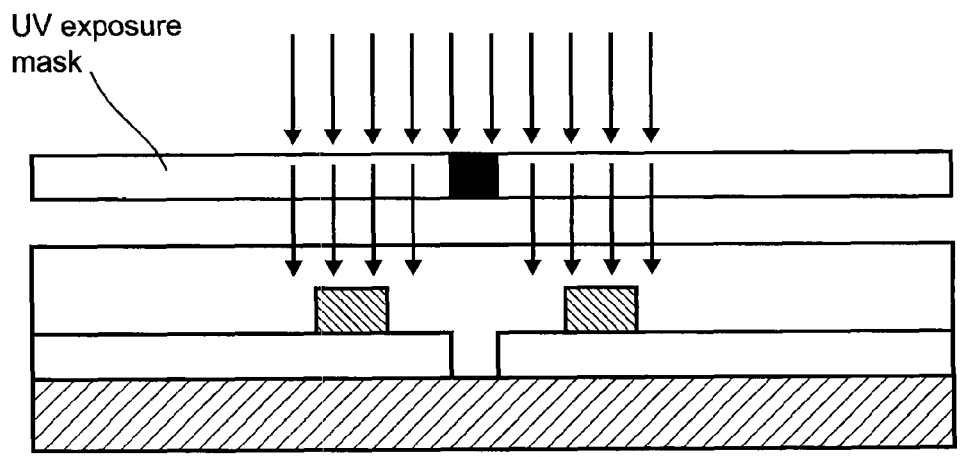
Figure 12H:
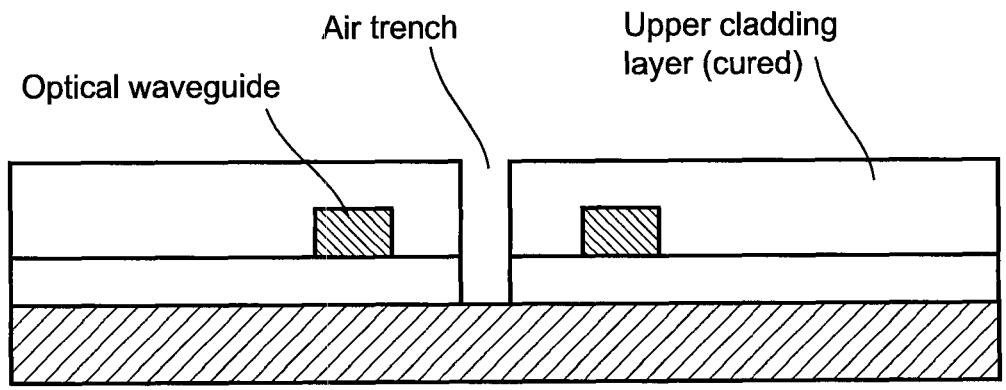
Figure 12I:
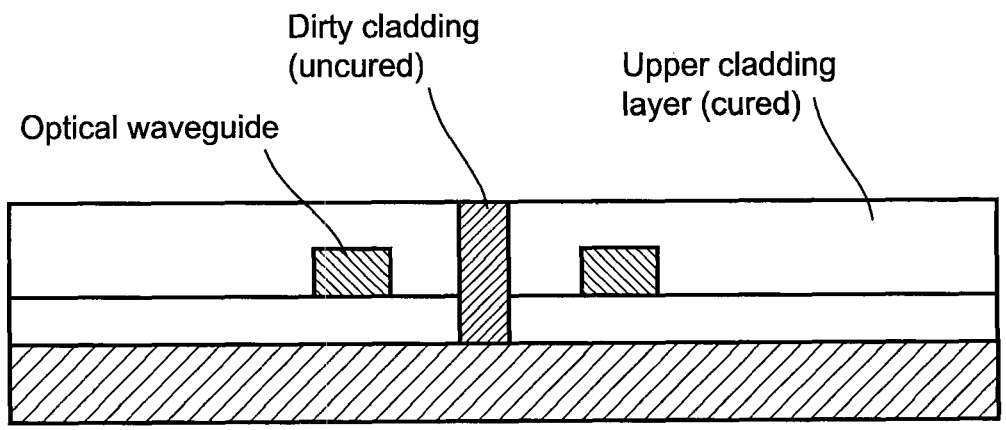

Next, as shown in FIG. 12F, an uncured optical cladding layer is provided over the resultant structure and, as shown in FIG. 12G, again exposed to substantially the same exposure mask used above for forming the lower trench 40. The resultant structure, shown in FIG. 12H shows a trench that extends through both the upper and lower cladding layers. Thus, the formation of a thin layer of optical core material on the top surface of the lower cladding will be interrupted by the trench in the lower cladding and will therefore prevent optical leakage between one waveguide to another along this layer. As shown in FIG. 12I, the trench may be filled with an optical absorbent material, optionally of the same or substantially similar refractive index as that of the cladding material.

Figure 13:
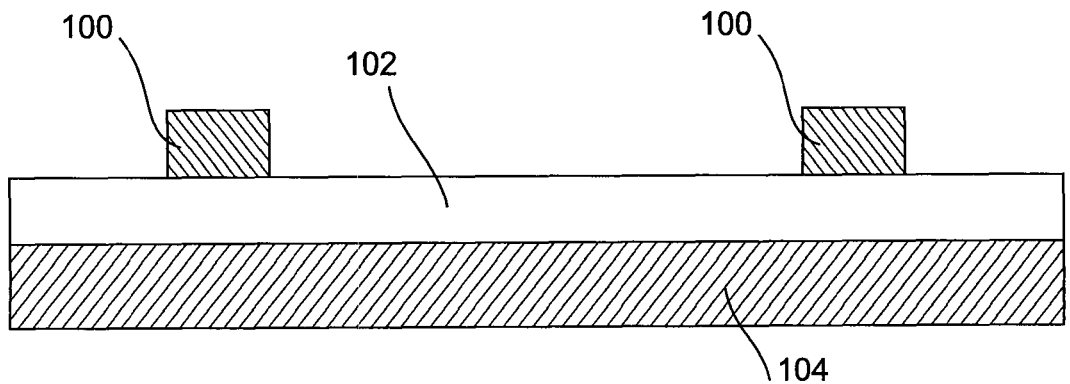
FIGS. 13 to 18 show the steps in a method of manufacture of an optical printed circuit board.
Figure 14:
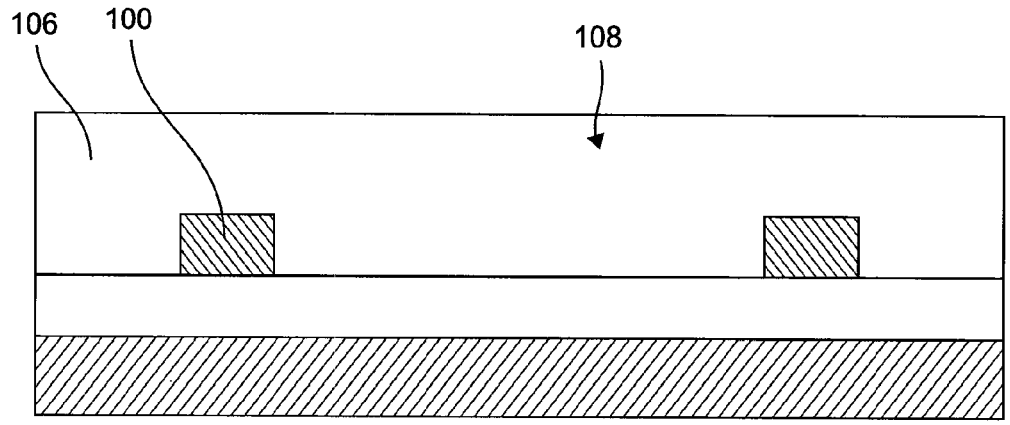

FIG. 13 shows a schematic representation of a semi-formed optical printed circuit board. The two waveguide cores 100 are formed on a cladding layer 102 which itself is formed on a support substrate layer 104. Next, as shown in FIG. 14, uncured upper cladding made of cladding material 106 is deposited over the patterned core layer such that cladding material 106 entirely covers the cores 100 and the space 108 between them on the device. Next, the uncured upper cladding 106 is exposed to appropriate radiation so as to cure the entire upper cladding layer 106.

Then, a cutting beam suitable for laser ablation of polymer, such as an excimer or $CO_2$ laser is used to cut a trench between the waveguide cores 100. Typically, beam shaping is deployed to ensure a flat intensity profile of the laser used to do such ablation or cutting and therefore a uniform etching depth of the trench between the cores 100. In other words, by ensuring that the cutting beam has a flat intensity profile, the etching depth will be constant wherever the beam falls.

This technique can therefore be used to create a trench between adjacent waveguides in the upper cladding layer, such as shown in FIG. 7I, or a trench between adjacent waveguides in the upper and lower cladding such as shown in FIG. 12H. It will be appreciated that the etch depth is controlled in dependence on the ablation beam intensity, so arbitrary etch depths between the waveguides can be achieved.

In the present method, instead of using a flat beam profile, a varied beam profile is used so as to achieve a varied etch depth. Preferably, the standard flat intensity profile is modified so as to be Gaussian in profile. The etched depth will therefore vary correspondingly.

Figure 15:
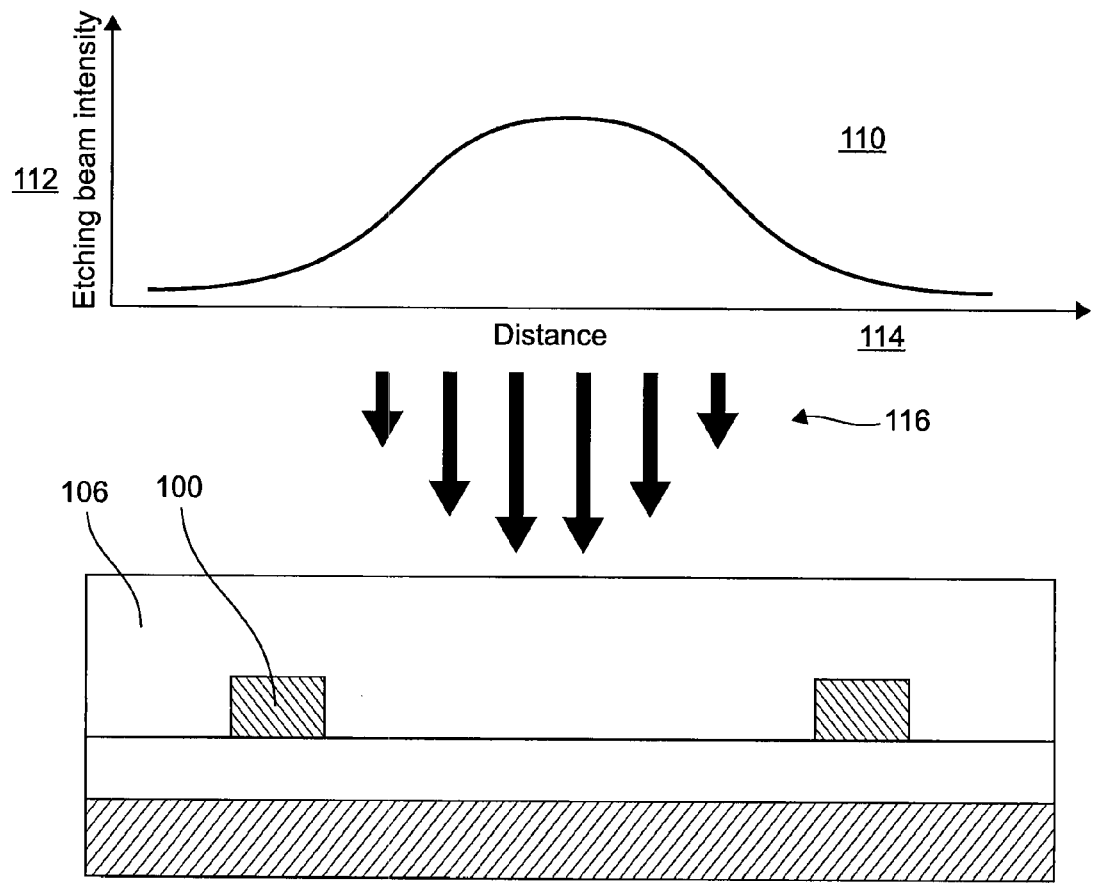
Figure 16:
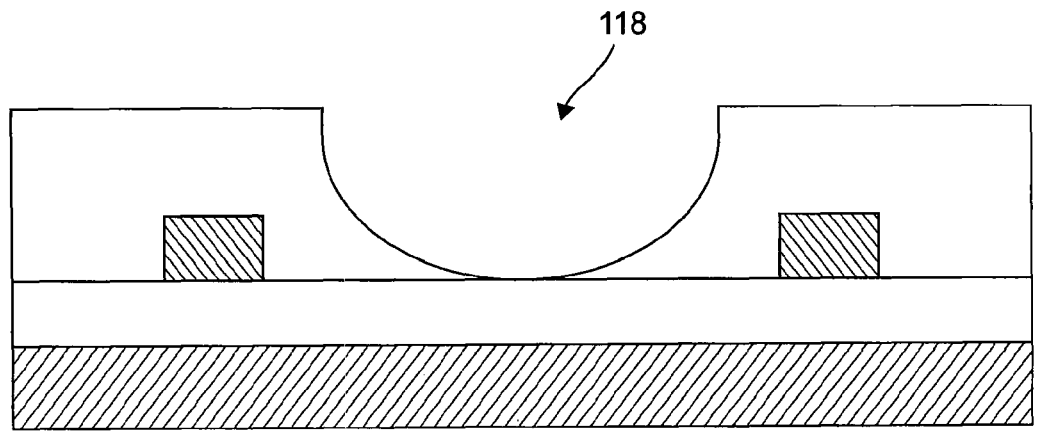

Referring to FIG. 15, a graph 110 is shown that demonstrates the etching beam intensity 112 as it varies with distance 114 along the cross-section of the waveguide cores and cladding. The laser beam (demonstrated schematically by the arrows 116) is used to cut a trench in the layer 106 which will vary in depth with distance. Referring to FIG. 16, a trench 118 is formed that has an inverted bell shape. It will be appreciated that the profile of the trench can be set at anything that might be desired and will, in this example, be determined by the intensity profile of the cutting beam.

Figure 17:
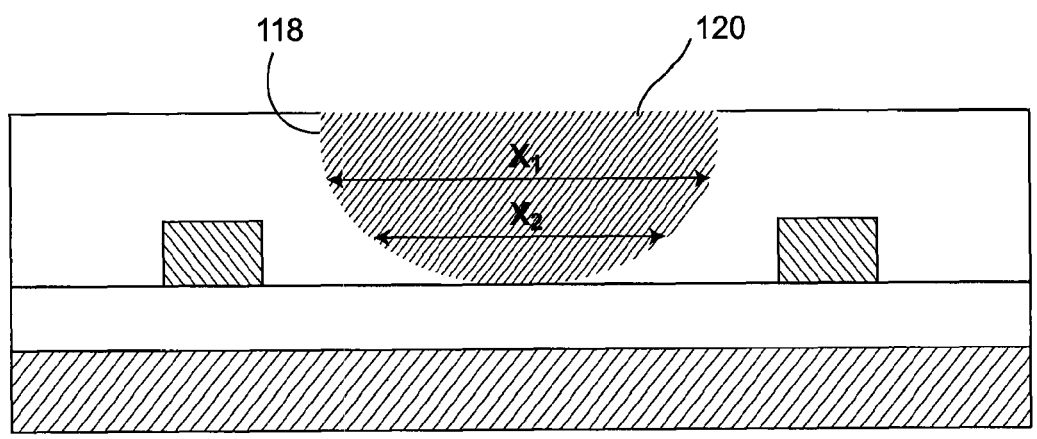

Next, as shown in FIG. 17, the trench 118 is filled in an appropriate manner with doped cladding material 120. Preferably, the doped cladding is a suspension of light-absorbent particulate material in the cladding polymer used over the waveguides. In other words, the material 120 is made up of a matrix defined by the cladding polymer together with light-absorbent particles suspended therein. It will thus be appreciated that the distance across the trench varies with height. In other words, $X_1$ is greater than $X_2$. In general, the width x of the trench varies with depth of the trench.

In order to ensure that the same level of absorption is provided through different widths of the trench, in one embodiment, the suspension is allowed to settle for a predetermined time until the variation of particulate concentration with height is such that the leaked light is substantially uniformly absorbed regardless of where it enters the absorbent trench. In other words the concentration of particulate matter will vary but the amount of particulate matter that a horizontally travelling light beam will encounter will be substantially the same irrespective of the height within the trench at which it crosses.

Figure 18:
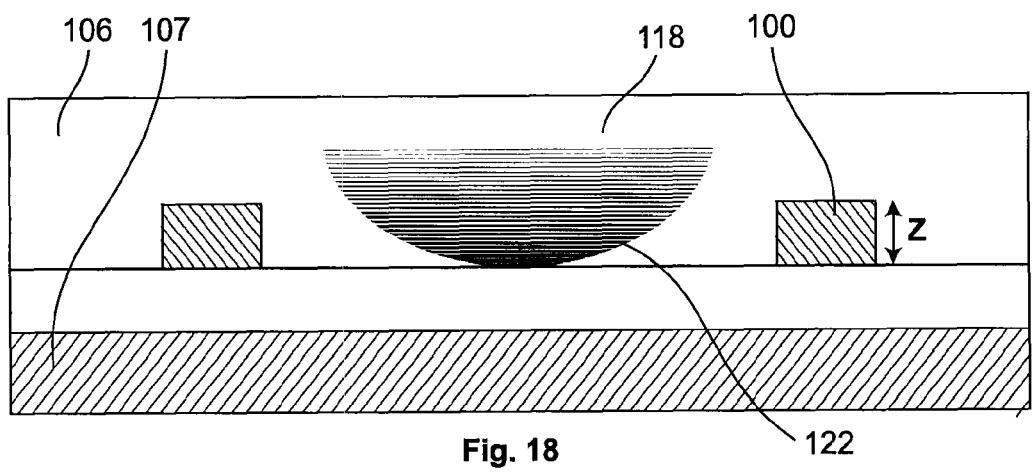

Referring to FIG. 18, this is shown schematically by the thickness of the lines 122 varying with depth within the trench. As the bottom of the trench is approached, the lines are thicker indicating a greater concentration of particulate material.

One means by which this variation in particulate concentration can be efficiently and effectively achieved is by using a liquid polymer with particulate matter suspended therein and allowing a period of time for the particulate matter to settle before the polymer material in the trench is cured. The longer this period of time is, the more the particulate material will have concentrated towards the lower regions of the trench.

Figure 18A:
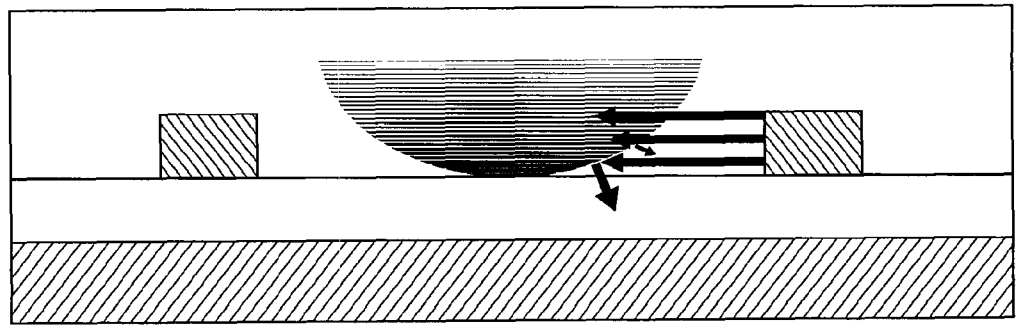
FIG. 18A shows a cross-section through an example of an optical printed circuit board.

Providing a trench which does not have substantially vertical walls in the region of the trench that corresponds to the height Z of the waveguide cores has particular significant advantages. Most notably, any light that leaks from the core 100 into the surrounding cladding and then encounters the boundary between the trench 118 and the cladding 106 may, if not absorbed by the particulate material within the trench, be reflected back towards the core 100. By providing a curved or angled surface of the trench in this region, any reflected light, will not be reflected back into the core but, instead, will be reflected into the lower cladding and towards the support 107 where it can be absorbed. This is shown schematically in FIG. 18A.

Figure 18B:
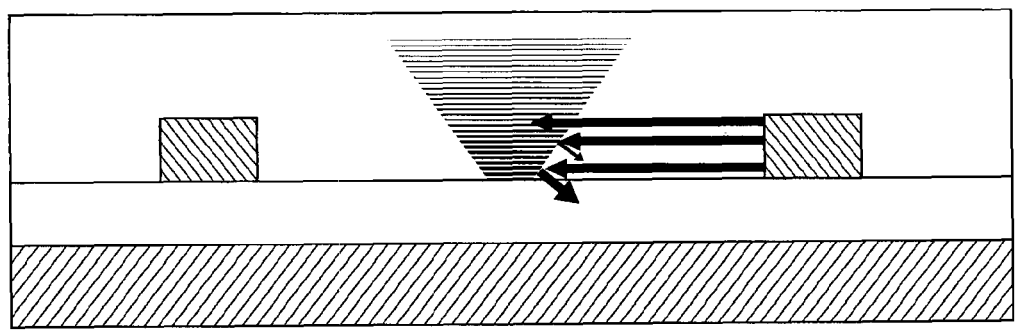
FIG. 18B shows a cross-section through an example of an optical printed circuit board.

It will thus be appreciated that the U-shaped trench of FIG. 18 is merely one example of an embodiment of this concept. More generally, any shaping of the trench walls that ensures that reflected light is directed away from the cores can be used. In one example, instead of the trench being U-shaped, it is V-shaped. This would have the same technical effect. FIG. 18B shows an example of this. In this case, the trench has the shape of a truncated V.

Figure 19:
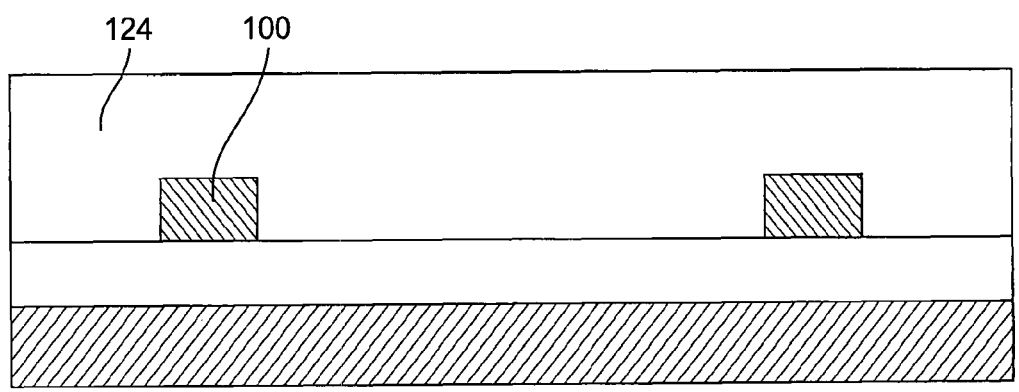
FIGS. 19 to 21 show the steps in a method of manufacture of an optical printed circuit board.
Figure 20:
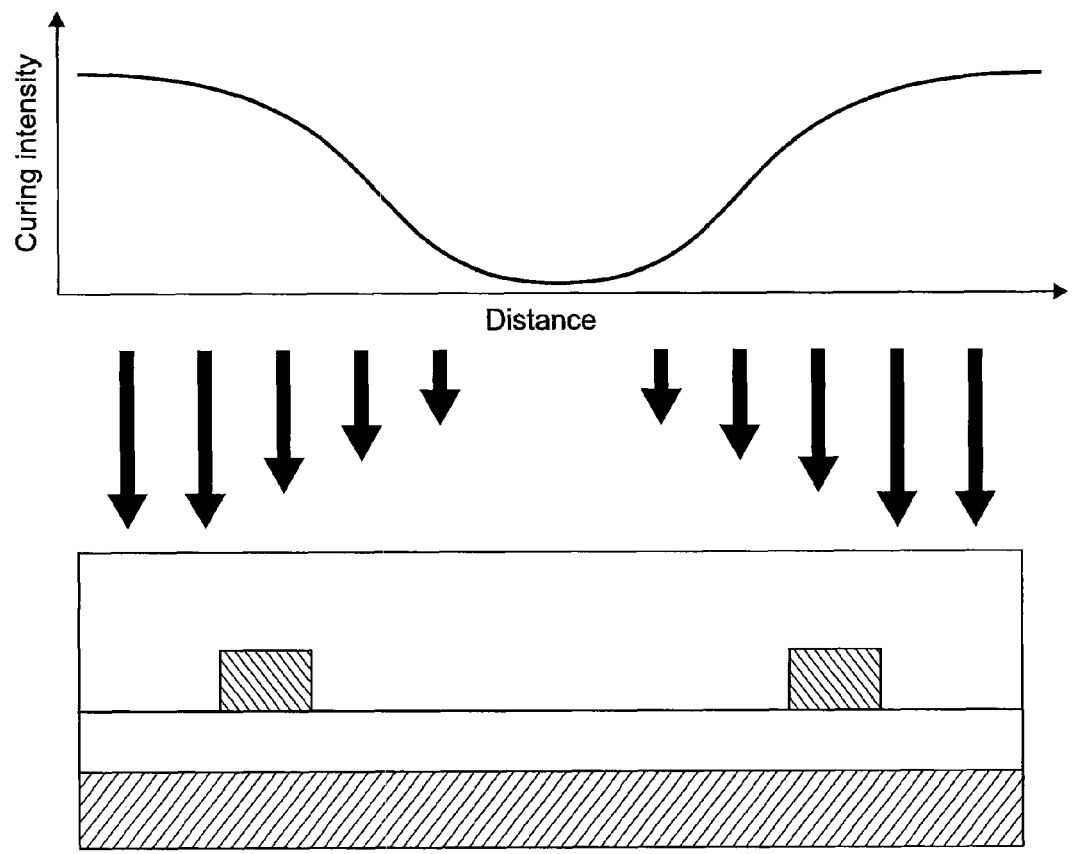
Figure 21:
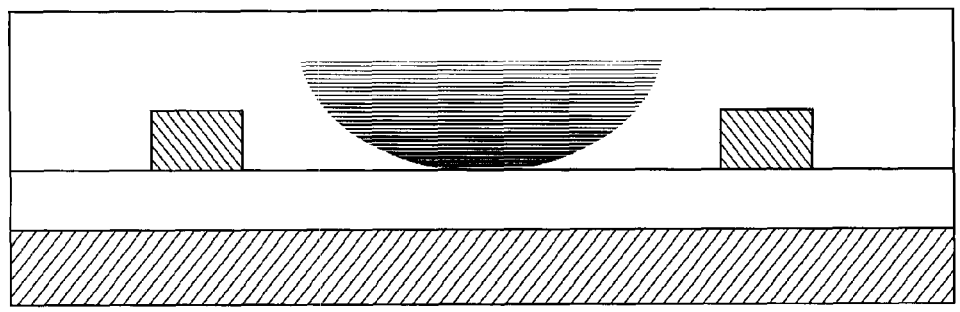

FIGS. 19 to 21 show a further embodiment of a method of making a trench of variable width for use in an optical printed circuit board. In this example, uncured cladding polymer 124 is provided over waveguide cores 100. Next, as shown in FIG. 20, a variable intensity curing radiation is provided. Due to the variation in the curing intensity, the resultant formation has a corresponding profile. In other words, the intensity profile of the curing beam is varied in an inverse Gaussian profile so as to create, in this example, an inverse bell-shaped trench.

Typically, the curing radiation frequency is in the ultraviolet part of the spectrum and is used to cure the cladding between the adjacent waveguides. Once the trench has been formed, it is filled with material in a similar manner as described above with reference to FIGS. 17 and 18. The resultant structure, shown in FIG. 21, is substantially the same as that shown in FIG. 18. Thus, the method is an alternative to that described above.

Figure 22:
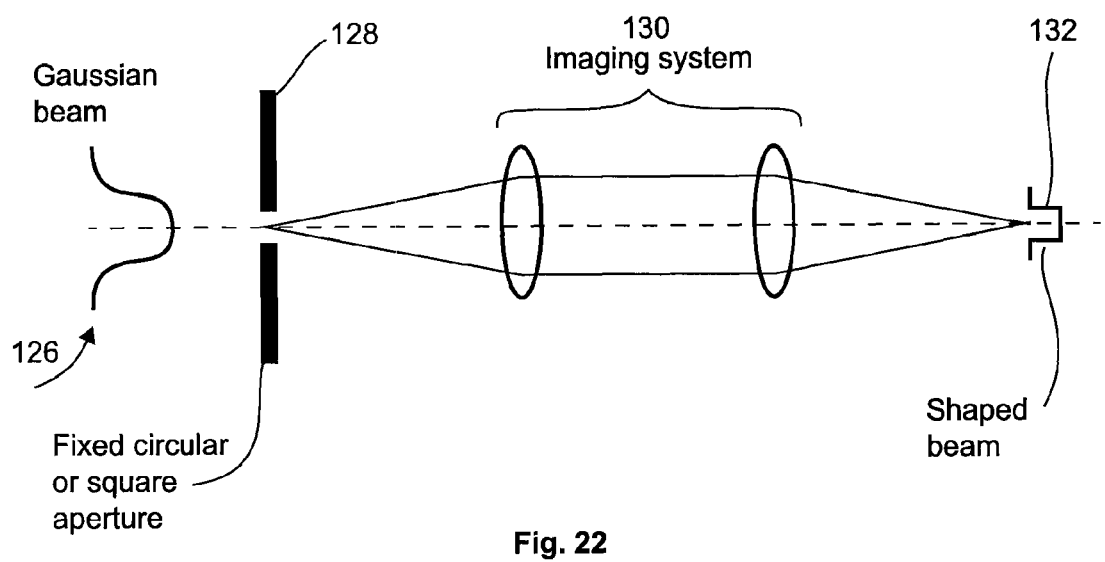
FIG. 22 shows a schematic representation of a laser-writing setup.

Typically, to generate a beam of curing radiation, a laser writing apparatus and set-up is provided. FIG. 22 shows an example of such an arrangement. In the example of FIG. 22, a Gaussian beam 126 is irradiated on an aperture such as a fixed circular or square aperture 128 An imaging system 130 is provided that serves to focus and collimate the beam transmitted through the aperture 128 to provide a shaped beam 132 which will typically have a flat profile. The imaging system 130 may be any suitable imaging system and typically includes one or more lenses of appropriate focal length and dimensions.

Preferably, the original beam 126 that is passed through the aperture 128 has a diameter significantly larger than that of the aperture. Indeed, preferably the diameter of the aperture is less than 1/e of the original Gaussian beam 126. This way, only the very top "flat" portion around the peak of the Gaussian intensity profile is passed through the aperture 128, giving rise to a writing beam with a uniform optical intensity profile across the width. This is usually considered important as curing is a function of intensity and a curing beam without a flat intensity profile would give rise to undesirable variation in the curing effect and geometry of the resulting waveguides.

Typically, a circular aperture is preferred when the beam is used to write bends, since, a circular aperture being radially symmetric, would not require that the beam is rotated (i.e. the translation stage held in either the laser or the substrate) to track the waveguide curvature as would typically be required for a square aperture.

Beam shaping and selective filtering technology is known and one example of a system is that provided by Jenoptik for use in Grayscale lithography.

In the present system, the optical system of FIG. 22 is modified to include a graduated neutral density filter or, more generally, a graduated filter. Such a filter is an optical filter that varies light transmission across its surface in dependence on the density profile of its light blocking elements or features.

Figure 23:
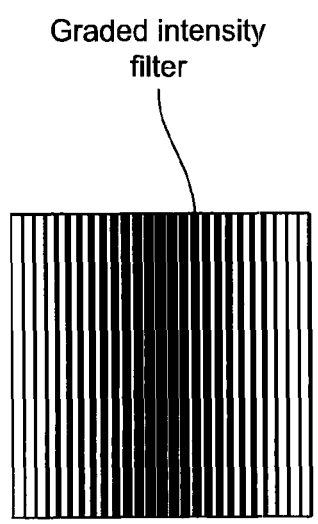
FIGS. 23 and 23A show schematic representations of graded intensity filters.
Figure 23A:
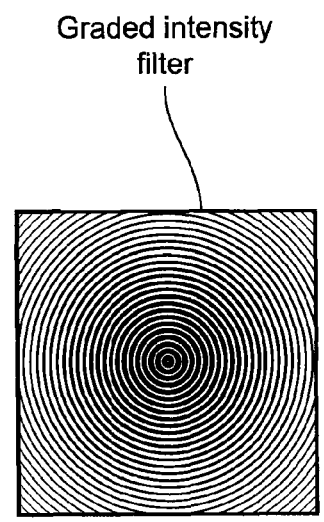
Figure 24:
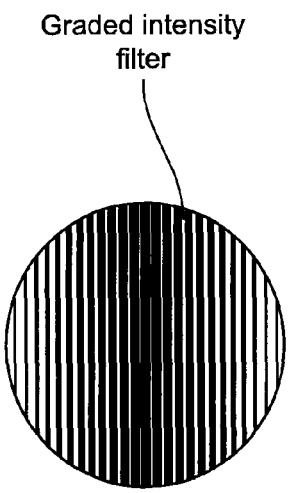
FIGS. 24 and 24A show schematic representations of graded intensity filters.
Figure 24A:
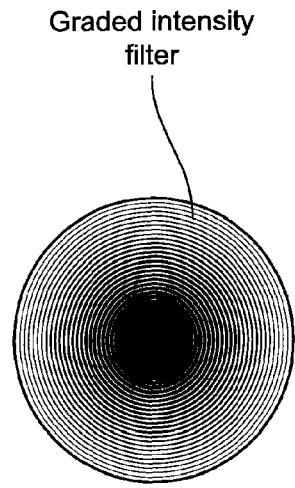

FIGS. 23 and 24 show schematic representations of graded intensity filters for use in the optical system of FIG. 22. In the present method, the filter, which may be considered a passive optical intensity profiler, is placed in the laser writing setup so as to convert the curing intensity profile to any desired profile. In particular, the profile is preferably changed from the flat profile conventionally used to a Gaussian profile which would be suitable for forming the bell-shaped trenches described above.

Preferably, the filter or insert is positioned somewhere in the imaging set-up of the beam writing apparatus.

As an alternative to a passive optical intensity profiler, in which the filter profile is permanent, one can also use a dynamically controlled optical intensity profiler in which the optical filter profile is programmable by the user. An advantage of this is that the same insert can be used to provide a variety of filter dependent features during a single manufacturing run. For instance in the present method or system, the trench shape could be changed in response to the changing environment along the waveguide path.

In one example, high resolution liquid crystal display technology may be used to enable programmable blocking or transmission of light through liquid crystal elements. In a preferred method liquid crystal elements in the filter plate would utilise the twisted nematic field effect to achieve arbitrary grey levels such as in twisted nematic displays.

Liquid crystal elements in twisted nematic displays for instance twist their polarisation in proportion to the voltage applied, allowing varying levels of light to pass through.

FIGS. 25 to 28 show a number of such possibilities.

Figure 25:
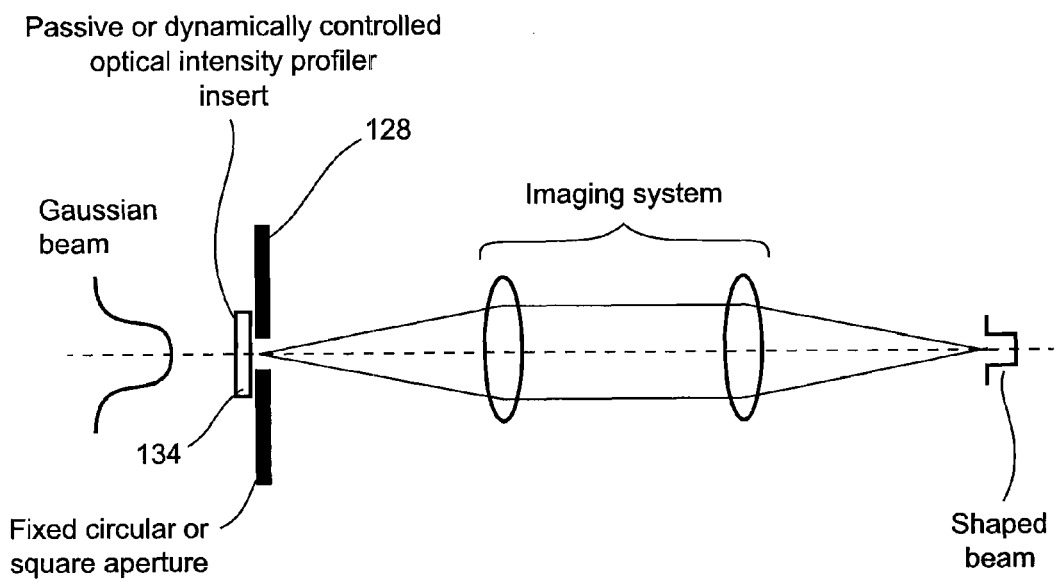
FIGS. 25 to 28 show schematic representations of laser-writing apparatus including intensity filters.
Figure 26:
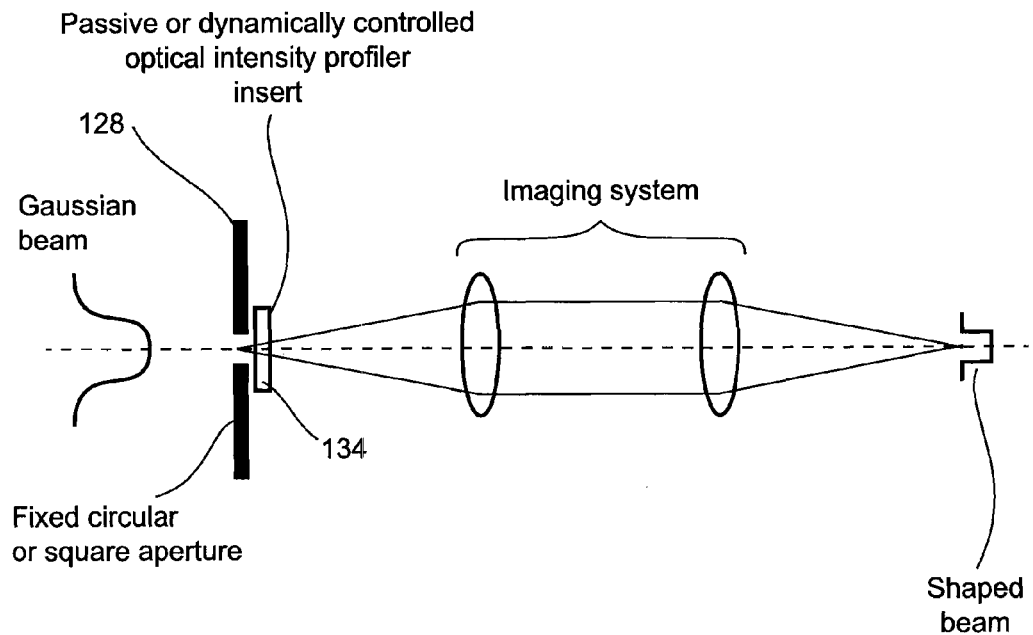
Figure 27:
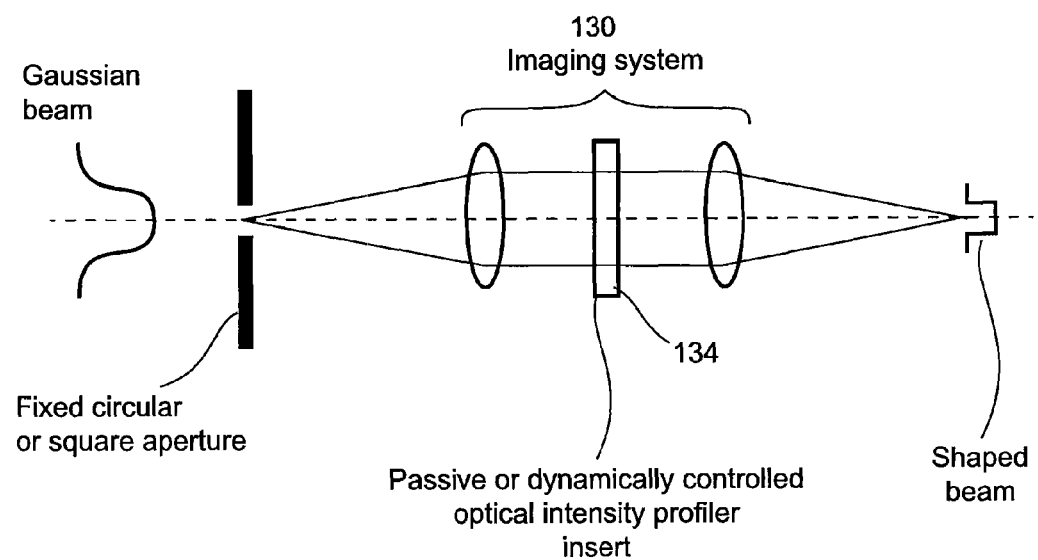

Referring to FIG. 25, a passive or dynamically controlled optical intensity profiler is provided before the aperture 128. In the example of FIG. 26, the insert 134 is provided immediately after the aperture 128. In the example of FIG. 27, the insert 134 is provided as part of the imaging system 130. It is shown in the example as being provided between two lenses but it will be appreciated that it can generally be provided anywhere within the imaging system irrespective of the type of imaging system and the number of lenses provided.

Figure 28:
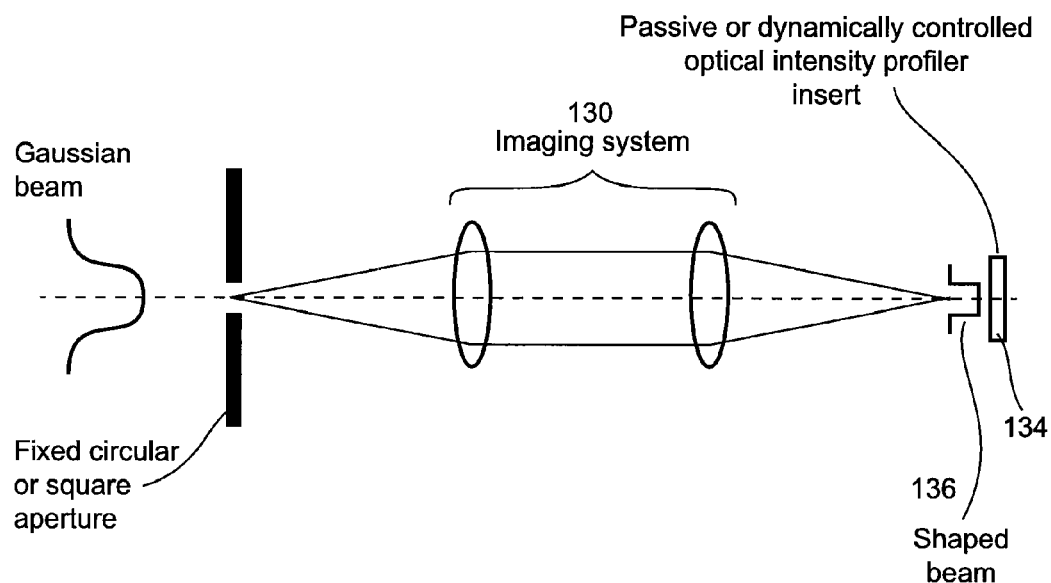

In the last example, shown in FIG. 28, the insert is provided after the imaging system so that it receives as its input the flat shaped beam 136 which is then appropriately filtered and shaped by the insert 134 to provide a beam with the required intensity profile.

In the example in FIG. 27, in which the insert is provided within the imaging system there are some particular advantages provided. In particular, such an arrangement enables fine granular resolution intensity profiles to be achieved with the use of a relatively coarse intensity filter profile. In other words, some averaging effect can be provided by including the insert within the imaging system.

Figure 29:
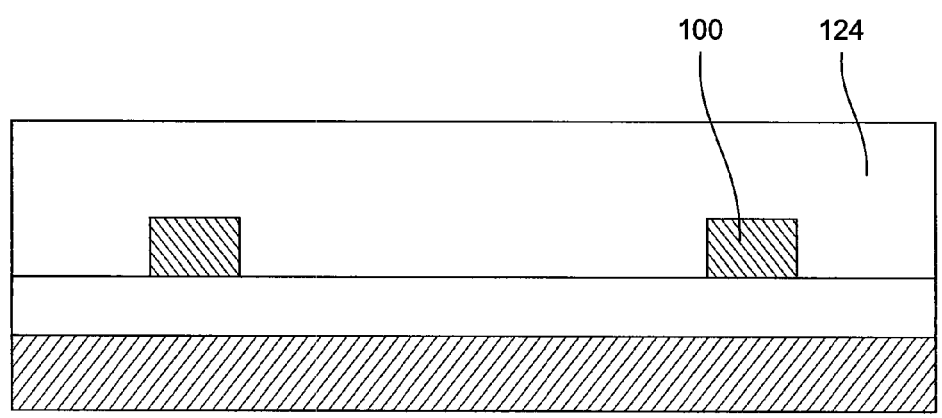
FIGS. 29 to 31 show steps in manufacture of an optical printed circuit board.
Figure 30:
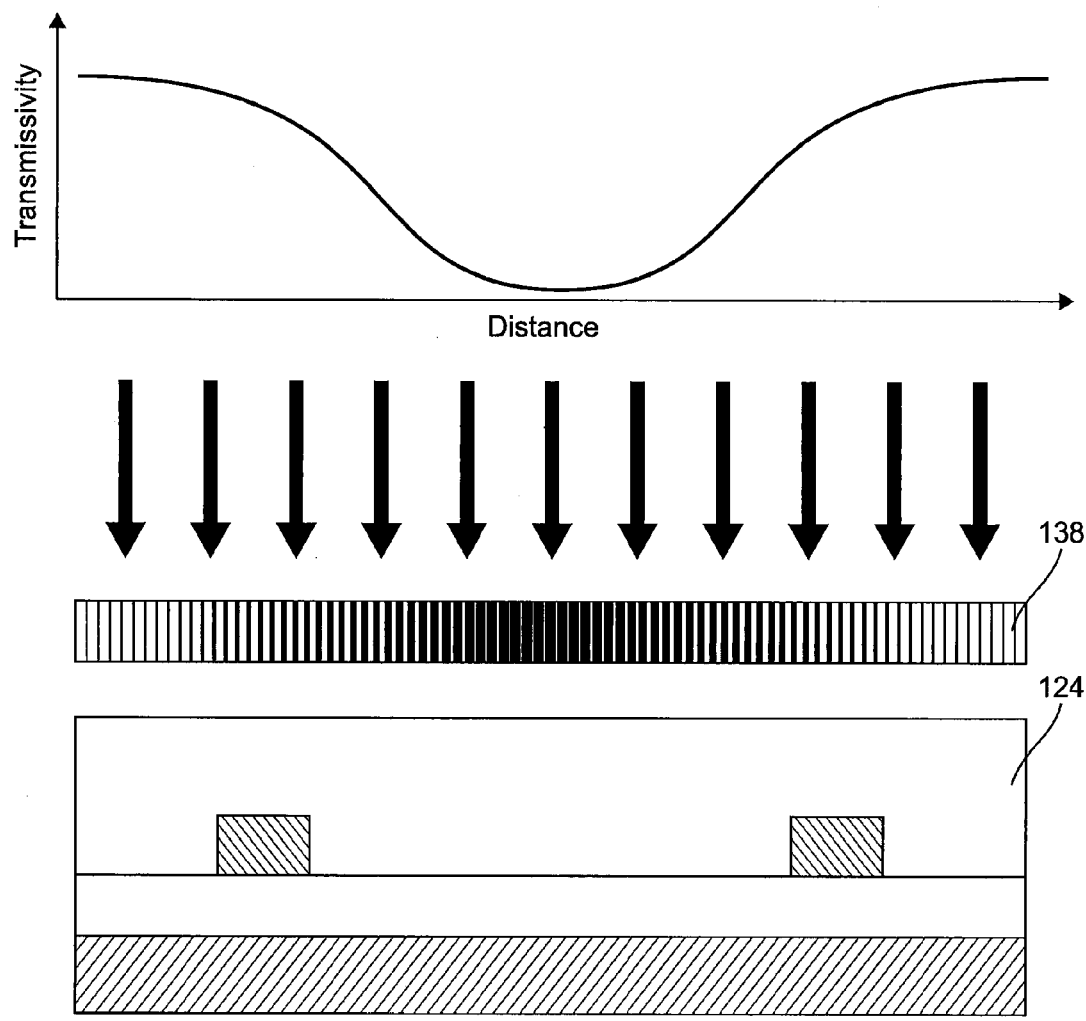
Figure 31:
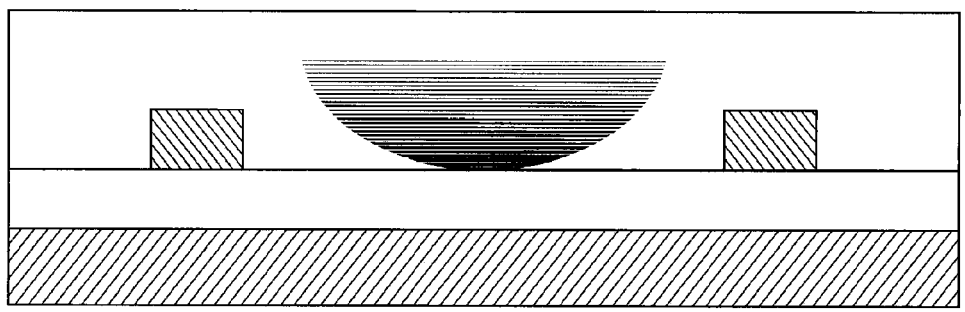

Next, referring to FIGS. 29 to 31, a further example of the method is described. In FIG. 29, a layer of uncured cladding 124 is again provided covering entirely the cores 100.

Next, referring to FIG. 30, a photolithographic mask 138 is provided. The mask 138 is preferably a Grayscale mask such that the transmissivity of the mask is greatest at the edges than in the centre. Thus, less curing radiation will pass through the centre of the mask 138 to the uncured polymer cladding 124. Thus, a further simple and reliable means for generating a trench that includes non-vertical side walls, e.g. such as a U-shaped trench, is provided. The results are shown schematically in FIG. 31.

As explained above, the advantage of an inverted bell-shaped trench when filled with concentration varied particulate suspension is that the trench sidewalls are not vertical in the region where they are most likely to encounter stray signal light from the waveguide cores. The slope of the sidewalls varies (in the case of a U-shaped trench) in relation to the concentration of particulate at that level such that they are completely vertical above the height of the waveguide core where the concentration of light absorbent particulate is close to zero parts per million. The concentration increases as the slope angle of the trench wall changes from 90 degrees from the base (vertical) to zero degrees (horizontal). Thus, back-reflections from the lower parts where the concentration is higher will be deflected into the lower cladding and the support below it and not back into the waveguide core 100.

Figure 31A:
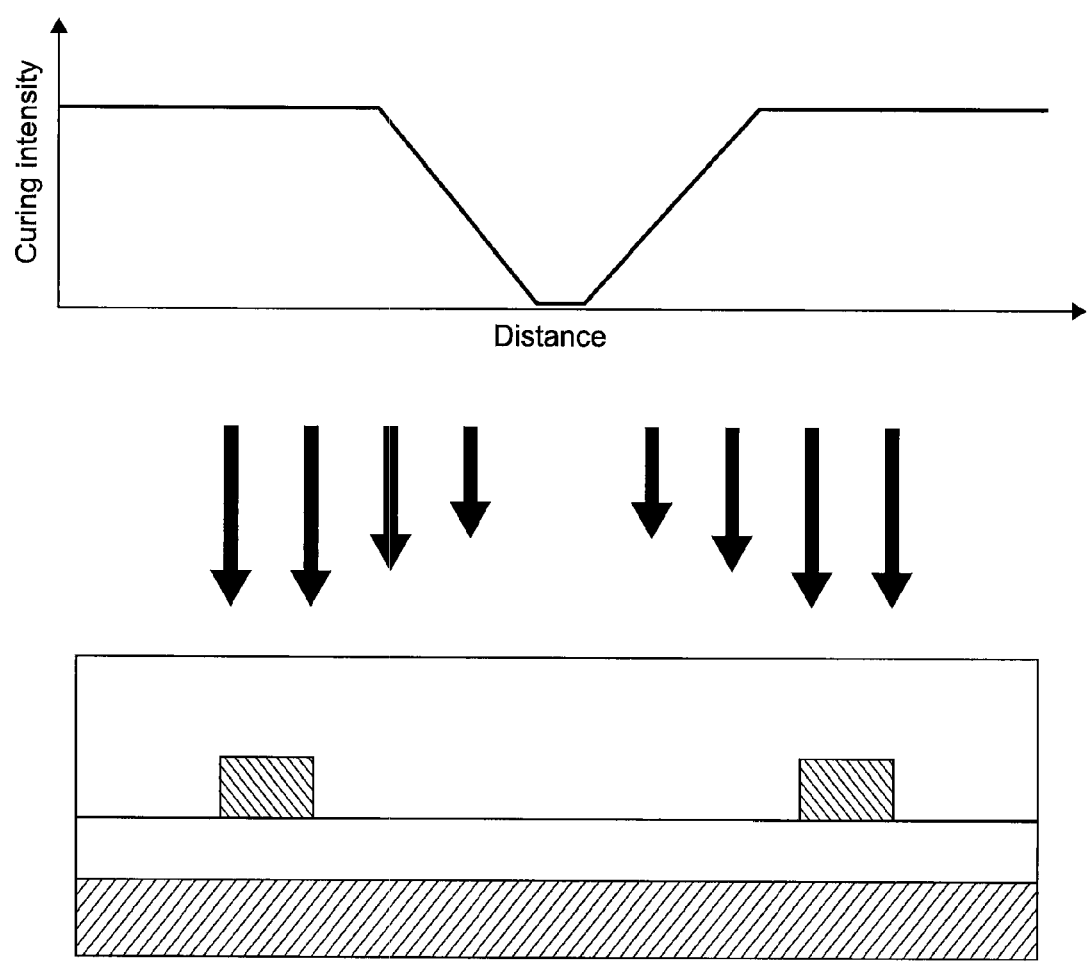
FIGS. 31A to 31C show schematic representation of methods of forming generally v-shaped trenches.
Figure 31B:
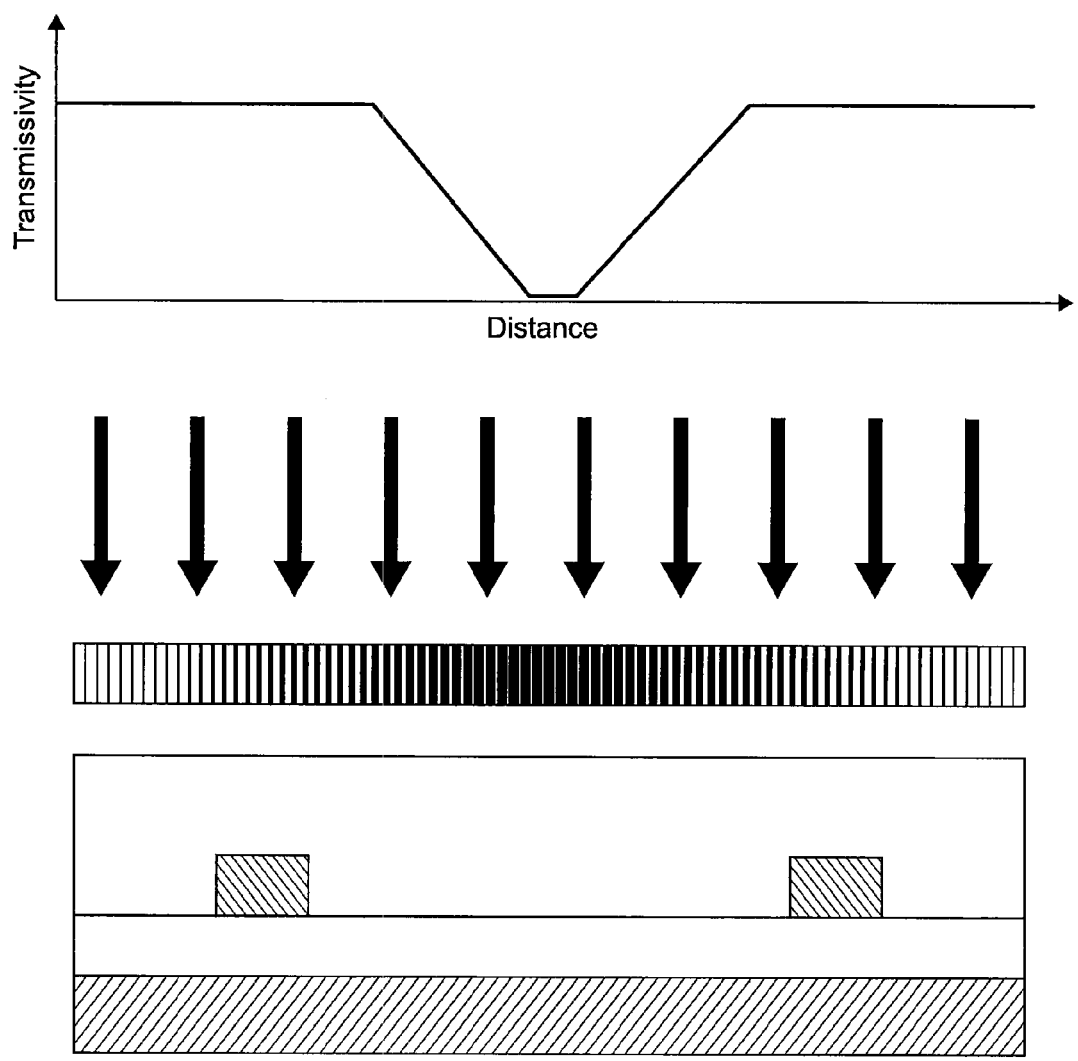
Figure 31C:
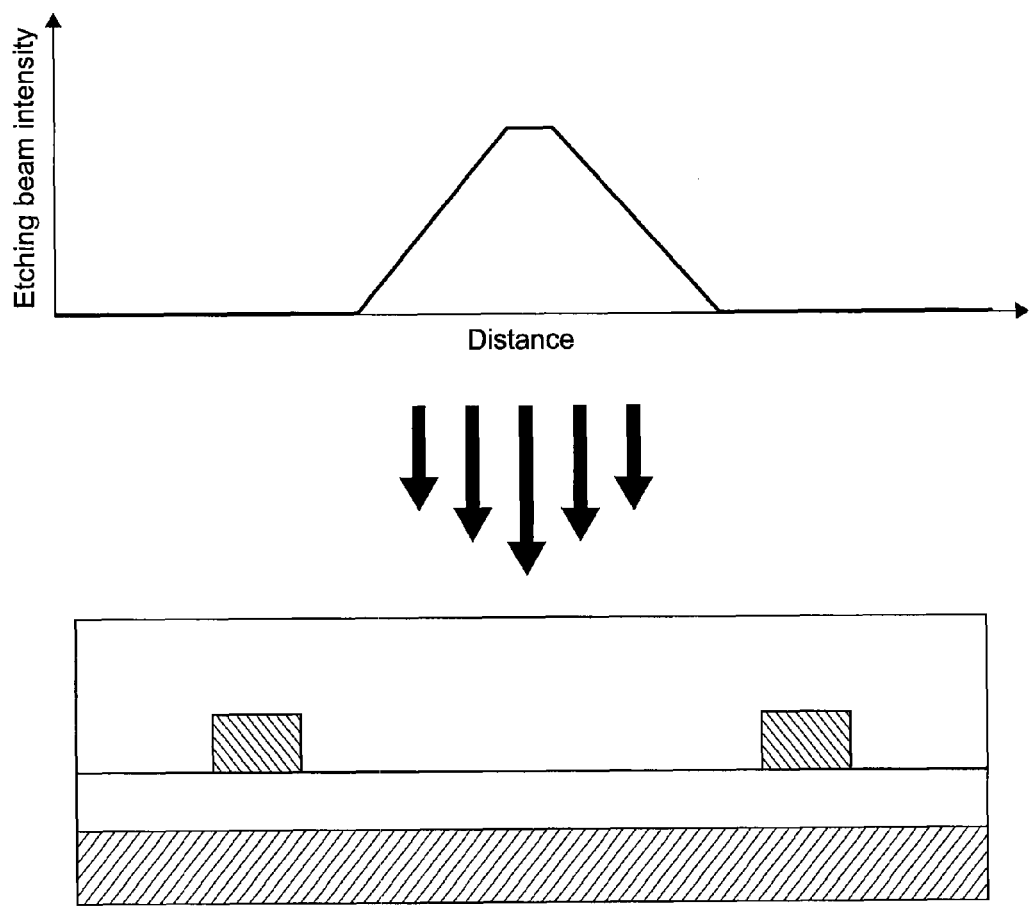

FIGS. 31A to 31C show schematic representation of methods of forming generally V-shaped trenches. In other words, the walls are flat but the angle they make with the base is greater than zero (alternatively viewed, the angle with the perpendicular to the base is less than 90 degrees). The trench has the form of a truncated V. Again though the walls are not vertical which, when reflection at the trench/cladding boundary does occur, will lead to reduced reflection of light back into the waveguides cores.

In FIG. 31A, an uncured cladding is shown and curing radiation, e.g. UV, is provided having an intensity that varies in the manner shown.

In FIG. 31B, a lithographic mask is provided and in this case, the transmissivity of the mask is as shown in the graph to have a profile that varies like a truncated V.

In FIG. 31C, the cladding is uniformly cured and is subsequently ablated using a source such as a laser having an intensity profile that varies as shown.

Figure 32:
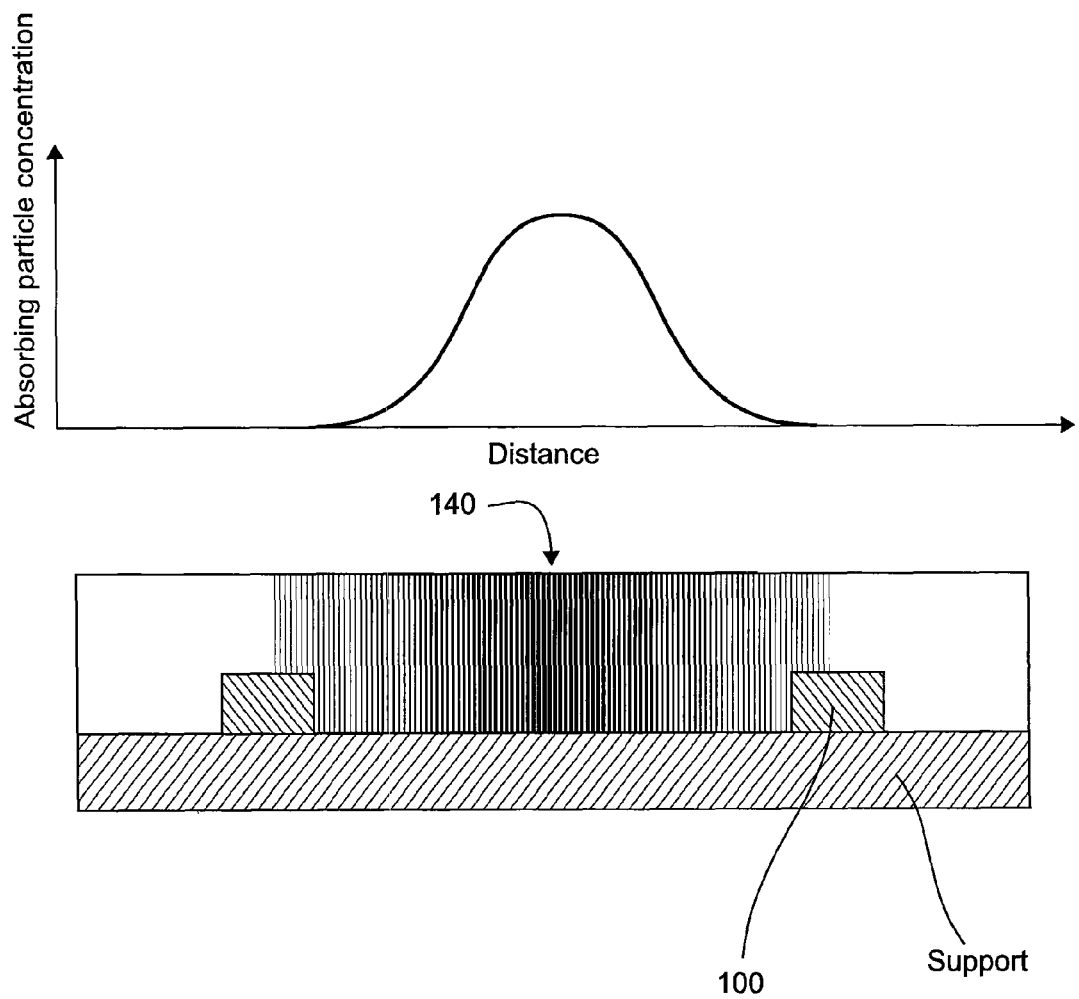
FIG. 32 shows a schematic representation of a Gaussian inter-waveguide particulate concentration within an optical printed circuit board.

In a further example, the light absorbent trench is generated such that the concentration of absorbent particles is not constant, but varies between the two waveguides. In a preferred embodiment, the concentration is graded over the distance between the two waveguides in a Gaussian profile. FIG. 32 shows a schematic representation of such an arrangement. In this example, waveguide cores 100 are provided on a support which will typically include a PCB support such as FR4 together with a lower cladding. A variable concentration of light absorbent particles is provided in the region between the waveguide cores 100 on the support. Thus, there will be no significant boundary encountered by signal light leaking from the cores 100.

The concentration of particulate varies gradually and so between any two adjacent positions, the difference in refractive index of the layer at that point is not significant such that there will be negligible reflection of leaked light into the cores 100. At the same time, since the concentration of light absor-bent particles does increase towards the central region 140, the proportion of leaked light that is absorbed is extremely high. Preferably, all leaked light is absorbed.

There will now be described a number of methods by which a substantially Gaussian inter-waveguide particulate concentration profile can be achieved.

Figure 33:
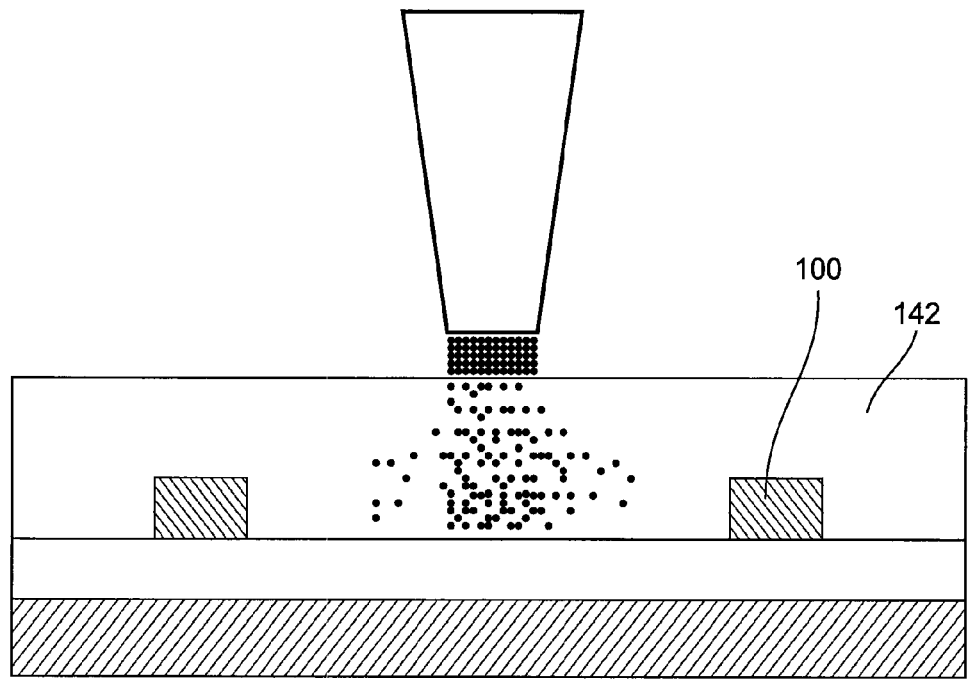
FIGS. 33 to 36 show representations of methods of formation of a Gaussian inter-waveguide particulate concentration profile within an optical printed circuit board.

FIG. 33 shows a first example. In this example, uncured cladding material 142 is provided surrounding waveguide cores 100. Next, dried particulates are deposited and allowed to settle and diffuse between the waveguides in a Gaussian or quasi-Gaussian concentration pattern. This may be achieved by direct application of dried particulates into uncured cladding. In other words, once the uncured clean cladding is deposited onto the upper layer of the device, absorbent particles are deposited along the centre line between adjacent waveguides and given time to diffuse into the liquid polymer.

The particles are preferably deposited directly by an inkjet printer type nozzle as shown in FIG. 33, which is moved over the uncured upper cladding to dry write the absorbent field between adjacent waveguides. Once the optimum diffusion profile has been achieved, then the upper cladding is uniformly or locally cured to permanently set the concentration pattern.

Parameters such as the position rate, nozzle translation speed, temperature of particulates, temperature of upper cladding, diffusion time (time allowed for depositing dry particulates to diffuse before curing) can be tuned to allow various optimum diffusion patterns. As the particles will not be deposited simultaneously, in a preferred embodiment, a second curing head with an LED or laser configured to cure the region only between the two waveguides follows the first deposition nozzle and is arranged and controlled to provide curing radiation in a controlled manner such as to achieve the optimum diffusion or concentration pattern.

In one example, so as to limit or entirely avoid accumulation of light-absorbent particles held on the unbroken surface of the uncured cladding by surface tension, some tool is used physically to mix up or disturb the cladding or its surface. This serves to encourage the light-absorbent particles to settle within the cladding matrix. Any suitable shaped or configured means could be used to disturb the surface or the bulk of the cladding material in this manner For example a simple stirrer and/or a plough-like component could be used. In one embodiment, the plough is physically coupled to the nozzle used to apply the light-absorbent material such that immediately prior to the material being applied to the surface, the surface is disturbed to enable penetration of the particulates into the material.

Figure 33A:
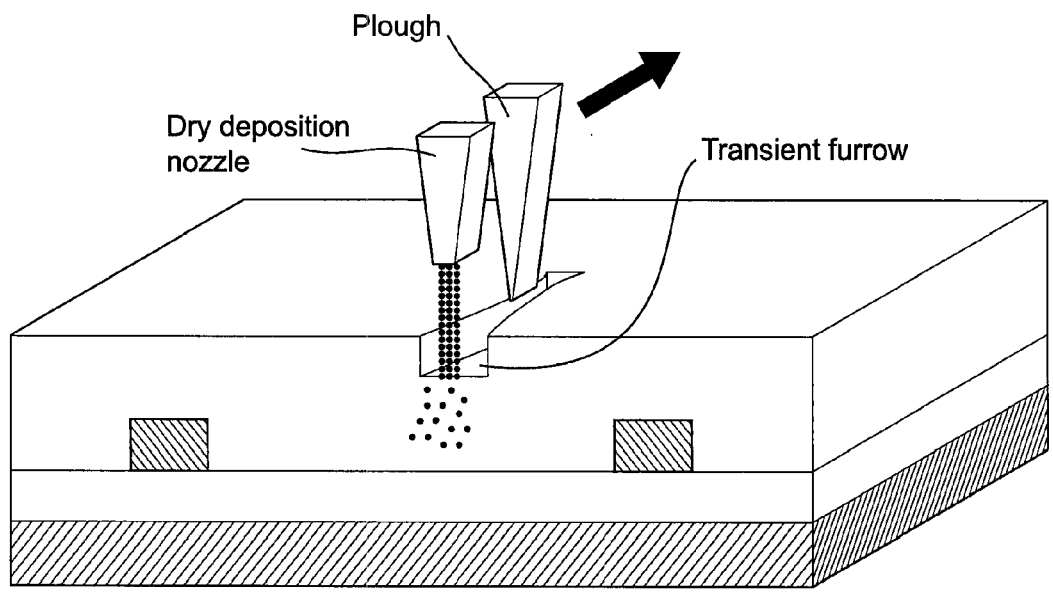

FIG. 33A shows a schematic representation of such an arrangement. In this example, a plough component is used to generate a temporary or transient furrow into which the light-absorbent material is deposited. This avoids the accumulation on the surface of the cladding material of light-absorbent particles. Since the material in which the light-absorbent particles are provided is liquid in its uncured state, the furrow fills in or closes up almost as soon as the light-absorbent particles have been deposited.

As explained above, in one example, the light-absorbent material is provided before the plough is used to disturb the surface.

Figure 34:
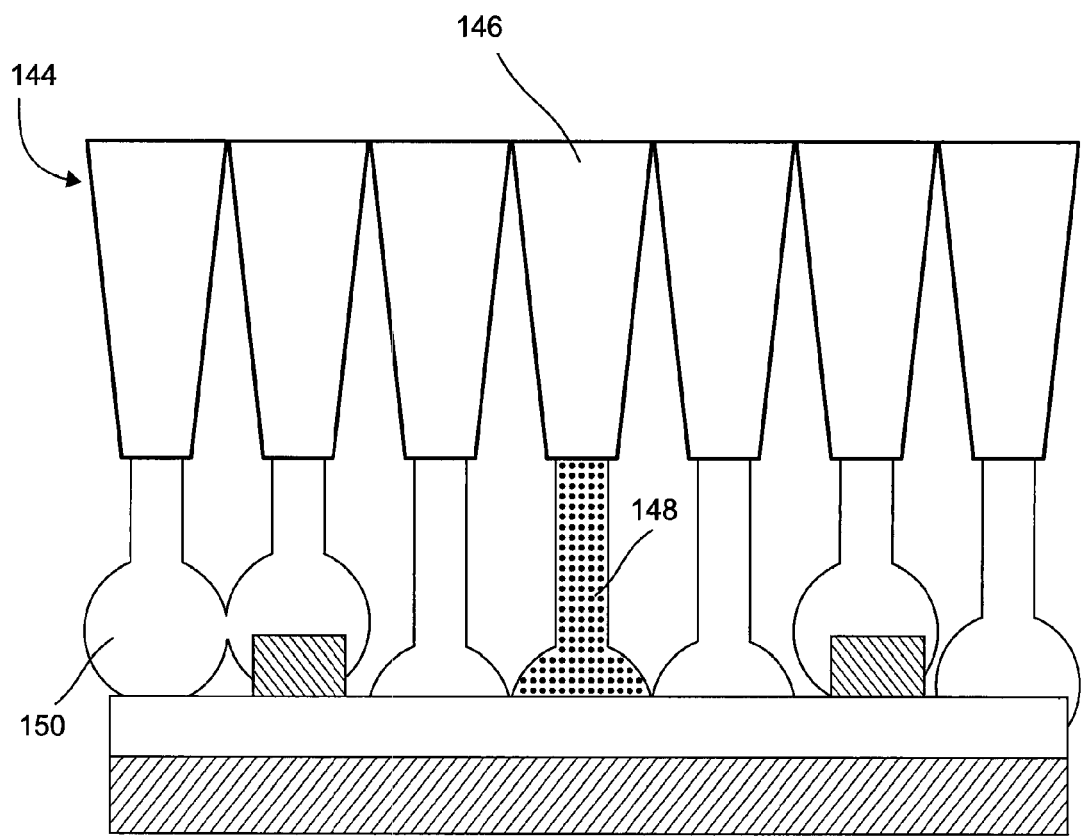
Figure 35:
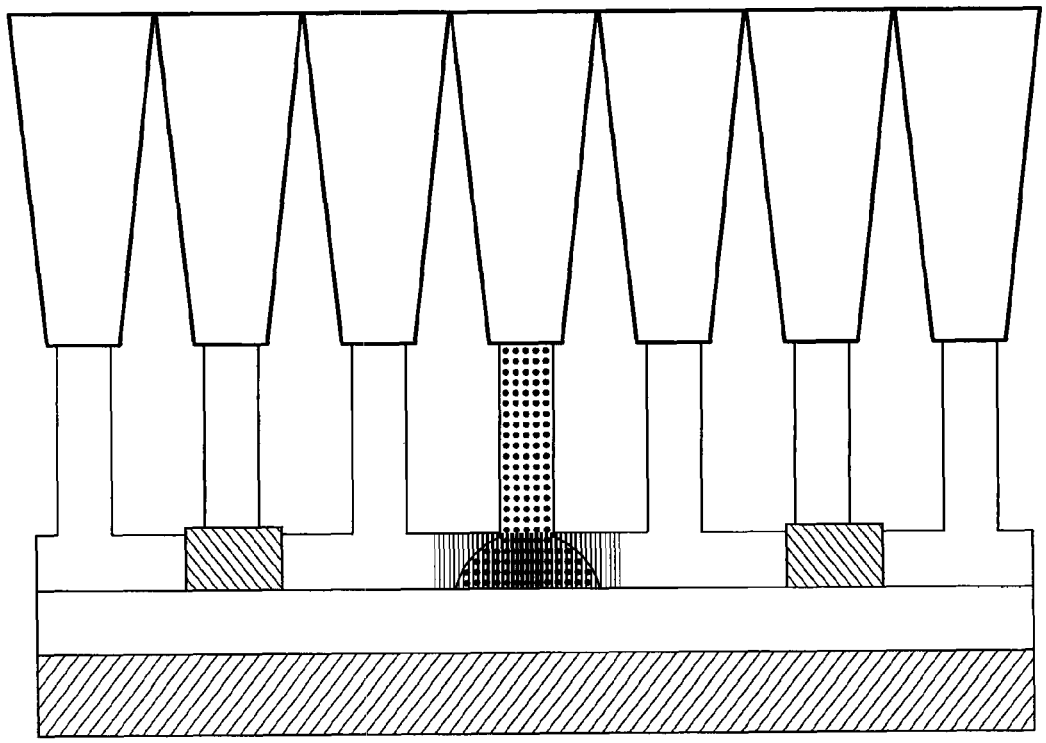
Figure 36:
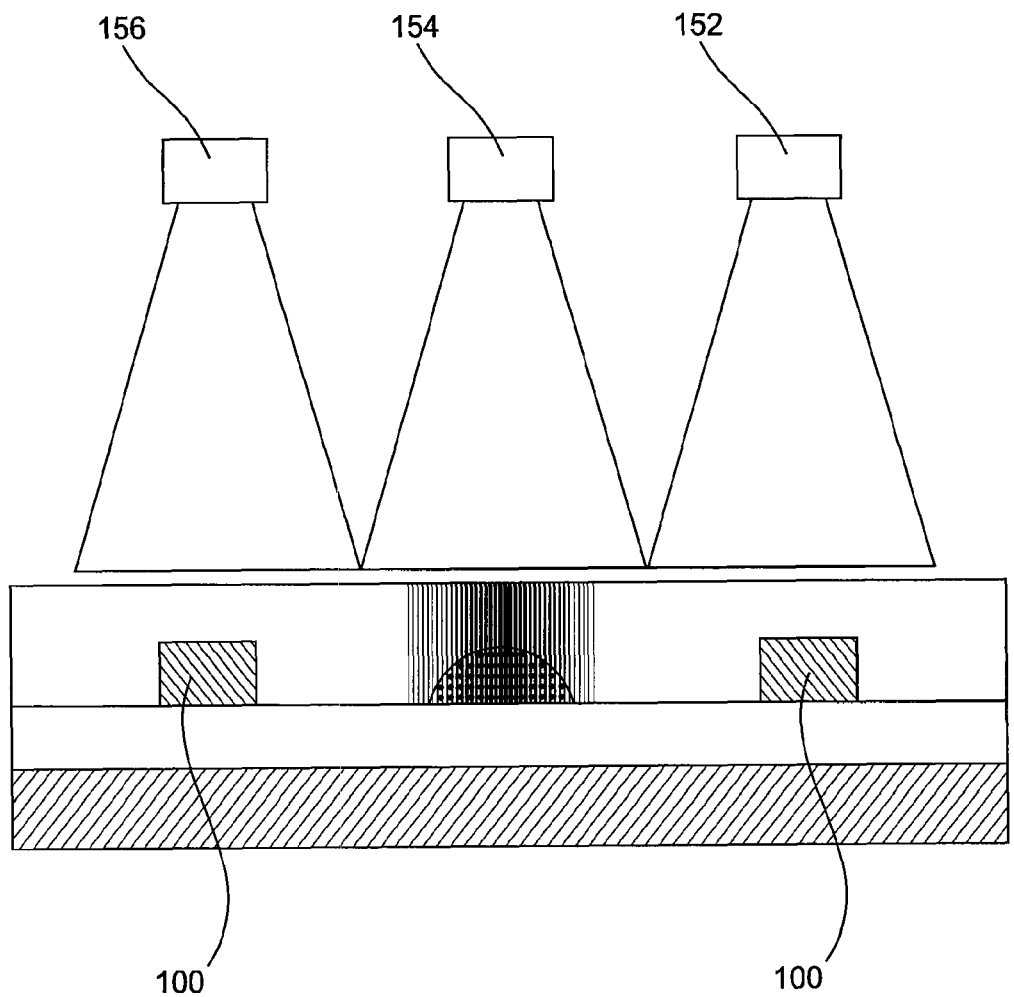

FIGS. 34 to 36 show another system and method by which this can be achieved. In the example of FIG. 34, plural nozzles 144 are provided. A first nozzle 146 is connected to a source of doped cladding material 148. Each of the other nozzles is connected to a source (which might be the same one) of undoped cladding polymer. The nozzles are controlled such as to each provide a layer of cladding material 150. Since the cladding material will be substantially liquid, the impurities or light-absorbent particles within the stream 148 will diffuse such as to provide a varied concentration profile of the light-absorbent particulates.

In other words, a multi-nozzle polymer deposition system is used whereby one or more nozzles are used to deposit doped cladding from a reservoir and the other nozzles deposit clean cladding drawing from a separate reservoir. Parameters can be tuned to achieve the optimum particulate concentration profile. These parameters include deposition rate, individual nozzle aperture dimensions, nozzle translation speed, individual nozzle deposition rates, curing intensity profile and curing rate. Thus, these parameters can be varied in such a way as to achieve the desired result.

FIG. 35 shows the next stage in the process following on from FIG. 34. The upper cladding is half filled with clean cladding material in a uniform manner. Then, as described above, a multi-nozzle arrangement is provided in which different ones of the nozzles are connected to reservoirs of uncured cladding including different concentrations of light-absorbent particles. In one example, only one of the nozzles (close to the centre of the device) is connected to uncured polymer including light-absorbent particles. All the others are connected to clean, uncured cladding polymer. Alternatively, in one example, variations are provided in the concentrations of light-absorbent particulates provided in plural reservoirs connected to respective nozzles.

FIG. 36 shows the process by which the deposited upper cladding (deposited as described above with reference to FIGS. 34 and 35) may be cured. Since it might be desired to cure some of the upper cladding sooner than the rest then plural curing radiation sources 152 to 156 are provided. In the examples shown, initially sources at the lateral extreme of the device are activated so as to cure the polymer around the cores 100. Subsequently, once sufficient time has elapsed to allow the required diffusion of the light-absorbent particles the curing source 154 is activated to cure the central region. Although in the example if FIG. 36, plural curing radiation sources are provided it will be appreciated that the same source could be used and simply activated in a patterned or timed manner to achieve the desired result. In other words, a single source could be used first to cure the undoped cladding in the region of the polymer cores and then, once it has done this, move to the central region where the cladding is doped and provide curing radiation as required.

It will be appreciated that positive and negative photosensitive materials may be used. In a negative core material, those portions of the material exposed to light will become insoluble to developer (solvents) while those portions not exposed to light can be removed with a developer. Therefore, the mask is arranged to allow light to pass through in those areas which are to form the waveguide structures. In contrast, in a positive core material, those portions of the material not exposed to light will become insoluble to developer (solvents) while those portions exposed to light can be removed with a developer. Therefore, in this case, the mask serves to block only those areas from light which are to form the waveguide structures. Throughout the description above, the optical material in question is a negative material, i.e. a material for which those portions exposed to light will become insoluble to developer (solvents). Therefore the masks serve to allow light to pass through in the areas which are to form the waveguide structures. The alternative configurations can of course be used. Indeed, if a positive material is used, the intensity or transmissivity profiles on the laser writing and photolithography cases are reversed.

In the present system, it is preferred that the concentration of absorbent particles be so sparse as to render the trench filling doped material a heterogeneous rather than a homogeneous material, which will weaken the definition of the boundary edge between the clean and doped cladding, the effective index change in the doped cladding being due to the Kramers Kronig relations.

The Kramers-Kronig relations allow one to calculate the refractive index profile and thus also the chromatic dispersion of a medium solely from its frequency-dependent losses, which can be measured over a large spectral range. Note that a similar relation, allowing the calculation of the absorption from the refractive index, is much less useful because it is much more difficult to measure the refractive index in a wide frequency range.

Modified Kramers-Kronig relations are also very useful in nonlinear optics. The basic idea is that the change in the refractive index caused by some excitation of a medium (e.g. generation of carriers in a semiconductor) is related to the change in the absorption. As the change in the absorption is normally significant only in a limited range of optical frequencies, it is relatively easily measured. Such methods can also be applied to laser gain media, e.g. for calculating phase changes in fiber amplifiers associated with changes of the excitation level. Note that in the case of rare-earth-doped gain media, for example, it is not sufficient to consider only the changes in gain and loss around a certain laser transition, because changes in strong absorption lines in the ultraviolet spectral region are also important.

Therefore by changing the absorbtion of the medium macroscopically (in bulk) one changes the effective refractive index, thus leading to Fresnel losses.

It is such stark Fresnel losses at the cladding air trench boundary or the boundary between the cladding and any other homogenous material of different refractive index which is to be avoided as this would give rise to unwanted reflections at that boundary back into the primary waveguides.

In the present system, the concentration of absorbent particles is selected such that the trench filling material can be considered to be effectively a clean cladding with "occasional" light absorbent particles. Thus, the definition of the boundary between the clean cladding and the doped cladding is weakened such that the intensity of the back reflections into the primary waveguide is also reduced. Indeed, some of the back reflected light itself may be absorbed as it passes back towards the waveguide core through the region of absorbent material.

A number of features are disclosed in the present application and a number of these may be summarised as follows. It will be appreciated that any appropriate combination of two or more of these features can be provided in an optical PCB or a method of making an optical PCB:

1. Sparse Particulate Concentration in Inter-Waveguide Trench

The concentration of absorbent particles is sparse so as to render the trench filling doped material a heterogeneous rather than a homogenous material. This serves to weaken the definition of the boundary edge between the clean and doped cladding, the effective index change in the doped cladding being due to the Kramers Kronig relations.

2. Inverted Bell Shape Trench Filled with Doped Cladding with a Varied Concentration Profile to Compensate for Trench Width Variation The shape of the trench etched or patterned in the clean cladding between adjacent waveguides is an inverted bell or more generally has side walls that at least in part are not "vertical" with respect to the PCB support or major plane.

This may be achieved by laser ablation using a laser beam having a Gaussian intensity profile or by laser writing with graded filters placed in the optical set-up.

This may also be achieved using photolithographic methods using masks with graded intensity patterns.

In order to ensure the same or similar levels of absorbtion at different heights within the trench (taking into account that due to the non-vertical walls the thickness will vary), the suspension of light-absorbent particles within cladding material is allowed to settle for a predetermined time until the variation of particulate concentration with height is such that leaked light is more or less uniformly absorbed regardless of where it enters the absorbent trench.

3. Inverted Bell Shape Trench Fabrication by Laser Ablation

A method of fabricating an inverted bell shaped trench by laser ablation, whereby the intensity of the laser beam varies in a Gaussian profile such as to cut out an inverted bell shaped trench between adjacent waveguides.

4. Inverted Bell Shape Trench Fabrication by Laser Writing

A method of fabricating an inverted bell shaped trench by laser writing, whereby adaptive optics or graded filter optics are used in the laser writing set-up to create an inverted Gaussian intensity profile over the curing beam, giving rise to an inverted bell shaped trench (in a negative material).

5. Inverted Bell Shape Trench Fabrication by Photolithography

A method of fabricating an inverted bell shaped trench by photolithography whereby the blocking structures on the photolithographic mask have a graded rather than stepped transmissivity profile. An inverse Gaussian transmissivity profile aligned between adjacent waveguides of the curing radiation gives rise to an inverse bell shape trench between those waveguides (in a negative material).

6. Gaussian Inter-Waveguide Particulate Concentration

The concentration of absorbent particles within the trench is not constant but variable between the two waveguides. Preferably, the concentration is graded over the distance between the two waveguides in a Gaussian profile.

7. Method of Creating Gaussian Inter-Waveguide Particulate Concentration Profile Through Dry Deposition of Particulates A method of creating Gaussian inter-waveguide particulate concentration profile in which clean uncured liquid cladding material is applied and dry particulates then deposited and allowed to settle and diffuse within between waveguides in a Gaussian or quasi-Gaussian concentration pattern.

8. Method of Creating Gaussian Inter-Waveguide Particulate Concentration Profile Through Multi-Nozzle Polymer Jetting A method of creating Gaussian inter-waveguide particulate concentration profile in which a polymer ink jetting head with multiple nozzles drawing individually from clean or doped cladding reservoirs is used to print a Gaussian concentration profile between waveguides.

9. Kramers-Kronig Compensatory Inter-Waveguide Trench Material

A method of compensating for the Kramers-Kronig change in bulk refractive index by choosing a trench material composed of a matrix of light-absorbent particulates suspended within a material with a different refractive index to that of the cladding such that the modified refractive index of the inter-trench material is the same as that of the cladding material at least within the operational wavelengths of the optical signal. This will allow for greater particle concentrations and therefore greater absorbtion without having to worry about the definition of the trench boundary or the homogeneity of the trench filling material. By appropriate choice of suspension material and particulate concentration one can create a homogenous trench filling material which does not cause Fresnel boundary reflections.

Embodiments of the present invention have been described with particular reference to the examples illustrated. However, it will be appreciated that variations and modifications may be made to the examples described within the scope of the present invention.

The invention claimed is:

1. An optical printed circuit board, comprising:
at least one optical waveguide for carrying optical signals on the optical printed circuit board, the waveguide comprising an optical core surrounded by an optical cladding material; and
a trench formed adjacent to the at least one optical waveguide, wherein the trench contains a matrix material having suspended therein a light absorbent material to absorb light that strays from the at least one waveguide, in which the light absorbent material is selected to be light absorbent over a range of wavelengths from about 600 nm to about 1700 nm; and
in which a concentration of the light absorbent material within the trench is sparse such that a combination of the light absorbent material with the matrix provides a heterogeneous mixture of matrix material with occasional light absorbent material;
wherein a region extending from a boundary between the trench and the optical cladding material up to approximately 15 microns into the trench has significantly lower concentration of light absorbent material than a remainder of the trench.

2. An optical printed circuit board according to claim 1, wherein there are at least two optical waveguides, and the trench is formed between the at least two optical waveguides thereby suppressing optical cross-talk between the at least two optical waveguides.

3. An optical printed circuit board according to claim 1, wherein the matrix material has substantially the same refractive index as the optical cladding material surrounding the optical core of the waveguide.

4. An optical printed circuit board according to claim 3, wherein an optically absorbent material is suspended in the matrix material arranged within the trench.

5. An optical printed circuit board according to claim 4, wherein the optical absorbent material is selected from the group consisting of carbon, carbon powder.

6. An optical printed circuit board according to claim 1, wherein each optical waveguide comprises a lower cladding, an optical core and an upper cladding, wherein the trench is provided in one or both of the upper cladding and the lower cladding.

7. An optical printed circuit board according to claim 1, in which the waveguide is a multimode waveguide.

8. An optical printed circuit board, comprising:
at least one optical waveguide for carrying optical signals on the optical printed circuit board; and
a trench formed adjacent to the at least one optical waveguide, wherein the trench contains a light absorbent material to absorb light that strays from the at least one waveguide, in which the light absorbent material is selected to be light absorbent over a range of wavelengths from about 600 to about 1700 nm;
wherein the trench includes one or more sloped side walls; and
wherein the concentration of light absorbent material within the trench varies with depth in the trench.

9. An optical printed circuit board according to claim 8, in which the slope of the sloped side walls is curved such that the trench has the form of an inverted bell.

10. An optical printed circuit board according to claim 8, in which the slope of the sloped side walls is flat such that the trench has the form of an inverted truncated triangle.

11. An optical printed circuit board according to claim 8, in which the concentration of light absorbent material within the trench varies in dependence on the width of the trench at any particular depth.

12. An optical printed circuit board, comprising:
- at least one optical waveguide for carrying optical signals on the optical printed circuit board, the waveguide comprising an optical core surrounded by an optical cladding material; and
- a trench formed adjacent to the at least one optical waveguide, wherein the trench contains a light absorbent material to absorb light that strays from the at least one waveguide, in which the light absorbent material is selected to be light absorbent over a range of wavelengths from about 600 to about 1700 nm;
- in which in a region in the trench adjacent the boundary with the waveguide there is substantially no light absorbent material.

13. An optical printed circuit board according to claim 12, in which the thickness of the region that has substantially no light absorbent material is at least 5 microns.

14. An optical printed circuit board according to claim 12, in which there are at least two optical waveguides and the trench is provided between the two optical waveguides, wherein the concentration of light absorbent material varies across a width of the trench between the two waveguides in a substantially Gaussian or quasi-Gaussian manner.

15. An optical printed circuit board, comprising:
- at least one optical waveguide for carrying optical signals on the optical printed circuit board, the waveguide comprising an optical core surrounded by an optical cladding material and defining a longitudinal direction for propagation of light; and
- a trench formed adjacent to the at least one optical waveguide, wherein the trench contains a matrix material having suspended therein light absorbent material to absorb light that strays from the at least one waveguide, in which the concentration of light absorbent material varies within the trench in one or more of:
- a direction transverse to the longitudinal direction for propagation of light; and
- with depth in the trench.

* * * * *